US012754383B2

(12) United States Patent
Chen et al.

(10) Patent No.: US 12,754,383 B2
(45) Date of Patent: Oct. 6, 2026

(54) OPTICAL MODULE

(71) Applicant: HISENSE BROADBAND MULTIMEDIA TECHNOLOGIES CO., LTD., Qingdao (CN)

(72) Inventors: Jinlei Chen, Qingdao (CN); Yantao Zhu, Qingdao (CN); Yaxun Chi, Qingdao (CN); Baofeng Si, Qingdao (CN)

(73) Assignee: HISENSE BROADBAND MULTIMEDIA TECHNOLOGIES CO., LTD., Qingdao (CN)

( * ) Notice: Subject to any disclaimer, the term of this patent is extended or adjusted under 35 U.S.C. 154(b) by 611 days.

(21) Appl. No.: 18/204,333

(22) Filed: May 31, 2023

(65) Prior Publication Data

US 2023/0305248 A1 Sep. 28, 2023

Related U.S. Application Data

(63) Continuation of application No. PCT/CN2022/083053, filed on Mar. 25, 2022.

(30) Foreign Application Priority Data

May 13, 2021 (CN) ........................ 202110521317.X
Jul. 16, 2021 (CN) ........................ 202110806482.X
Jul. 16, 2021 (CN) ........................ 202121630599.9

(51) Int. Cl.
*G02B 6/42* (2006.01)
*G02B 6/43* (2006.01)

(52) U.S. Cl.
CPC ......... *G02B 6/4292* (2013.01); *G02B 6/4261* (2013.01); *G02B 6/428* (2013.01);
(Continued)

(58) Field of Classification Search
CPC .... G02B 6/4261; G02B 6/428; G02B 6/4284; G02B 6/4292; G02B 6/43
See application file for complete search history.

(56) References Cited

U.S. PATENT DOCUMENTS 8,814,229 B2 * 8/2014 Togami ................ G02B 6/4284
361/679.01
11,061,194 B2 * 7/2021 Zhou .................... G02B 6/4261
(Continued)

FOREIGN PATENT DOCUMENTS

CN 102615028 A 8/2012
CN 103630982 A 3/2014
(Continued)

OTHER PUBLICATIONS

International Search Report and Written Opinion mailed Jul. 1, 2022 in corresponding International Application No. PCT/CN2022/083053, translated, 21 pages.
(Continued)

*Primary Examiner* — Daniel Petkovsek
(74) *Attorney, Agent, or Firm* — Cozen O'Connor

(57) ABSTRACT

An optical module includes an upper shell, a lower shell, an optical engine, an optical port bracket, and an optical fiber adapter. The lower shell is covered with the upper shell and forms an accommodating cavity with the upper shell. The optical engine is disposed in the accommodating cavity. The optical port bracket is disposed on a bottom surface of the lower shell. The optical fiber adapter is connected to the optical engine and the optical port bracket. The upper shell includes first limiting members. The lower shell includes a first limiting boss. The optical port bracket includes a plurality of side walls and second limiting bosses, and two opposite side walls among the plurality of side walls are fixedly connected to the first limiting members. The second
(Continued)

limiting bosses are disposed on two opposite side walls of the plurality of side walls.

10 Claims, 11 Drawing Sheets

(52) U.S. Cl.
CPC .............. *G02B 6/43* (2013.01); *G02B 6/4246* (2013.01); *G02B 6/4284* (2013.01)

(56) References Cited

U.S. PATENT DOCUMENTS

| | | | | |
|---|---|---|---|---|
| 2019/0025528 A1* | 1/2019 | Sun | G02B 6/4256 |
| 2019/0391349 A1* | 12/2019 | Chen | G02B 6/4277 |
| 2022/0326460 A1* | 10/2022 | Zhou | G02B 6/428 |

FOREIGN PATENT DOCUMENTS

| | | | |
|---|---|---|---|
| CN | 109212688 | A | 1/2019 |
| CN | 109283632 | A | 1/2019 |
| CN | 109283634 | A | 1/2019 |
| CN | 110542957 | A | 12/2019 |
| CN | 111239934 | A | 6/2020 |
| CN | 111458815 | A | 7/2020 |
| CN | 211293367 | U | 8/2020 |
| CN | 212160162 | U | 12/2020 |
| CN | 112230350 | A | 1/2021 |
| CN | 113253400 | A | 8/2021 |
| CN | 113419315 | A | 9/2021 |
| CN | 215181035 | U | 12/2021 |
| IN | 201621024177 | A | 1/2018 |
| JP | 2007266400 | A | 10/2007 |
| JP | 2007317120 | A | 12/2007 |
| WO | 2018044295 | A1 | 3/2018 |

OTHER PUBLICATIONS

Chinese First Office Action mailed Jun. 2, 2022 in corresponding Chinese Application No. 202110521317.X, translated, 17 pages.

Chinese Second Office Action mailed Dec. 28, 2022 in corresponding Chinese Application No. 202110521317.X, translated, 11 pages.

Chinese Decision of Rejection mailed May 24, 2023 in corresponding Chinese Application No. 202110521317.X, translated, 14 pages.

* cited by examiner

OPTICAL MODULE

CROSS-REFERENCE TO RELATED APPLICATIONS

This application is a continuation application of International Patent Application No. PCT/CN2022/083053, filed on Mar. 25, 2022, pending, which claims priorities to Chinese Patent Application No. 202110521317.X, filed on May 13, 2021, Chinese Patent Application No. 202110806482.X, filed on Jul. 16, 2021, and Chinese Patent Application No. 202121630599.9, filed on Jul. 16, 2021, which are incorporated herein by reference in their entireties.

TECHNICAL FIELD

The present disclosure relates to the field of optical communication technologies, and in particular, to an optical module.

BACKGROUND

With the development of new services and application modes such as cloud computing, mobile internet, and video, the development and progress of optical communication technology have become increasingly important. In optical communication, an optical module is a tool for achieving interconversion between an optical signal and an electrical signal and is one of key devices in an optical communication device. In addition, with the development of optical communication technology, the demand for the transmission rate of the optical module is increasing.

SUMMARY

In one aspect, the present disclosure provides an optical module. The optical module includes an upper shell, a lower shell, an optical engine, an optical port bracket, and an optical fiber adapter. The lower shell is covered with the upper shell and provides an accommodating cavity with the upper shell. The optical engine is disposed in the accommodating cavity, and the optical engine is configured to realize emission or reception of light. The optical port bracket is disposed on a bottom surface of the lower shell, and a side surface of the optical port bracket proximate to the lower shell abuts against the bottom surface of the lower shell. An end of the optical fiber adapter is connected to the optical engine, and another end of the optical fiber adapter is connected to the optical port bracket. The upper shell includes a cover plate, at least one upper side plate, and at least one first limiting member. The upper side plate is connected to the cover plate. The upper side plate extends toward a direction proximate to the lower shell. The first limiting member is disposed at an end of the upper side plate proximate to the optical port bracket. The lower shell includes a bottom plate, at least one lower side plate, and at least one first limiting boss. The lower side plate is connected to the bottom plate. The lower side plate extends toward a direction proximate to the upper shell. The first limiting boss is disposed on an end of the lower side plate proximate to the optical port bracket. The optical port bracket includes a plurality of side walls and at least one second limiting boss. At least one side wall of two opposite side walls among the plurality of side walls is fixedly connected to the first limiting member. The second limiting boss is disposed on the at least one side wall of the two opposite side walls among the plurality of side walls. A side surface of the second limiting boss proximate to the optical engine abuts against the first limiting boss.

In another aspect, the present disclosure provides an optical module. The optical module includes an upper shell, a lower shell, an optical engine, and an optical port bracket. The upper shell includes a cover plate and at least one upper side plate. The upper side plate is connected to the cover plate. The upper side plate extends toward a direction proximate to the lower shell. The lower shell is covered with the upper shell and provides an accommodating cavity with the upper shell. The lower shell includes a bottom plate, at least one lower side plate, and at least one dispensing hole. The lower side plate is connected to the bottom plate. The lower side plate extends toward a direction proximate to the upper shell. The dispensing hole is disposed on an end of the lower side plate. The optical engine is disposed in the accommodating cavity, and the optical engine is configured to realize emission or reception of light. The optical port bracket includes a plurality of side walls. Two opposite side walls of the plurality of side walls are in contact with side surfaces where the dispensing holes are located. The two opposite side walls of the optical port bracket are fixedly connected to corresponding side surfaces of the lower shell by the adhesive injected through the dispensing holes. A side surface of the optical port bracket proximate to the upper shell is connected to the upper shell. An end of the optical fiber adapter is connected to the optical port bracket, and another end of the optical fiber adapter is connected to the optical engine.

BRIEF DESCRIPTION OF THE DRAWINGS

In order to illustrate the technical solutions of the present disclosure more clearly, accompanying drawings to be used in the description of some embodiments will be introduced briefly below. However, the accompanying drawings to be described below are merely accompanying drawings of some embodiments of the present disclosure, and a person having ordinary skill in the art may obtain other drawings according to these drawings. In addition, the accompanying drawings to be described below may be regarded as schematic diagrams and are not limitations on an actual size of a product, an actual process of a method and an actual timing of a signal to which the embodiments of the present disclosure relate.

DETAILED DESCRIPTION

Figure 1:
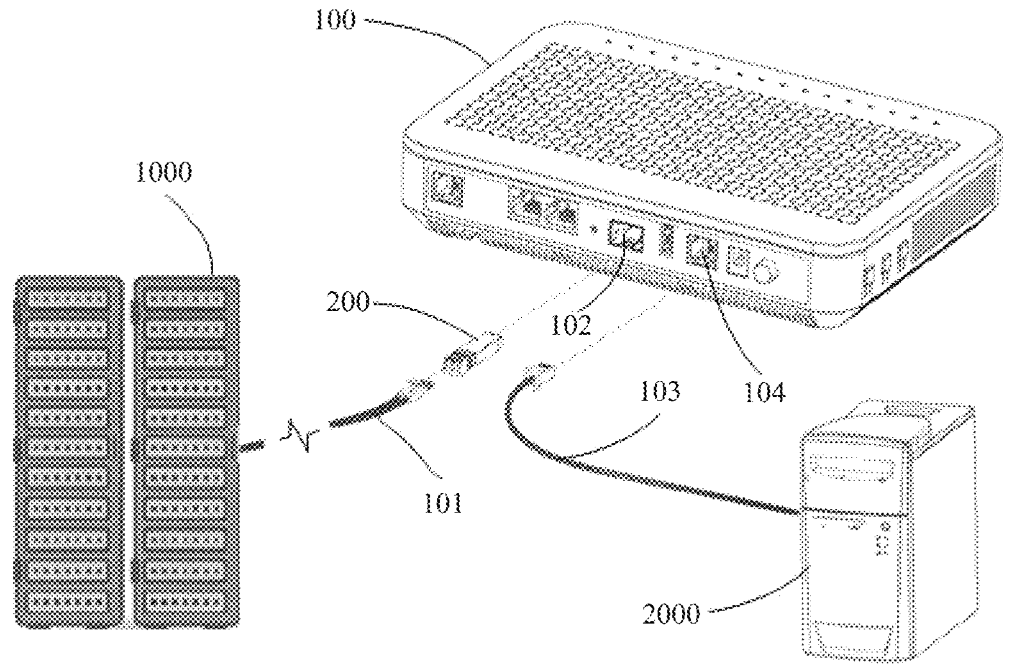
FIG. 1 is a partial diagram showing a structure of an optical communication system, in accordance with some embodiments.

Some embodiments of the present disclosure will be clearly and completely described below with reference to the accompanying drawings. However, the described embodiments are merely some but not all embodiments of the present disclosure. All other embodiments obtained by a person of ordinary skill in the art based on embodiments of the present disclosure shall be included in the protection scope of the present disclosure.

In the description of the present disclosure, it will be understood that, orientations or positional relationships indicated by terms "center," "upper," "lower," "left," "right," "top," "bottom," "inner," and "outer," are based on orientations or positional relationships shown in the drawings, which are merely to facilitate and simplify the description of the present disclosure, but not to indicate or imply that the devices or elements referred to must have a particular orientation, or must be constructed or operated in a particular orientation. Thus, it cannot be understood as a limitation to the present disclosure.

Unless the context requires otherwise, throughout the description and the claims, the term "comprise" and other forms thereof such as the third-person singular form "comprises" and the present participle form "comprising" are construed as open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are configured for descriptive purposes only but are not to be construed as indicating or implying relative importance or implicitly indicating the number of indicated technical features. Therefore, the features defined with "first" and "second" may explicitly or implicitly include one or more of these features. In the description of the embodiments of the present disclosure, the term "a plurality of" or "the plurality of" means two or more unless otherwise specified.

Some embodiments may be described using the expression "coupled" and "connected" along with their derivatives. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B, and C" has the same meaning as the phrase "at least one of A, B, or C," and they both include the following combinations of A, B, and C: only A, only B, only C, a combination of A and B, a combination of A and C, a combination of B and C, and a combination of A, B and C.

The phrase "A and/or B" includes the following three combinations: only A, only B, and a combination of A and B.

The phrase "configured to" used herein means an open and inclusive expression, which does not exclude devices that are configured to perform additional tasks or steps.

The terms such as "about," "substantially," or "approximately" as used herein include a stated value and an average value within an acceptable range of deviation of a particular value determined by a person of ordinary skill in the art, where the acceptable deviation range is determined by a person of ordinary skill in the art in consideration of the measurement in question and the error associated with the measurement of a specific quantity (i.e., the limitation of the measurement system).

In the optical communication technology, in order to establish information transmission between information processing devices, it is necessary to load information into the light and use the propagation of the light to realize information transmission. Here, the light loaded with information is an optical signal. When the optical signal is transmitted in an information transmission device, the loss of optical power can be reduced; thus, the high-speed, long-distance, and low-cost information transmission can be realized. A signal that the information processing device can recognize and process is an electrical signal. Information processing device usually includes optical network units (ONU), gateways, routers, switches, mobile phones, computers, servers, tablet computers, and TVs. The information transmission device usually includes optical fibers and optical waveguides.

The optical module can realize mutual conversion of optical signals and electrical signals between the information processing device and the information transmission device. For example, at least one of an optical signal input end or an optical signal output end of the optical module is connected to an optical fiber, and at least one of an electrical signal input end or an electrical signal output end of the optical module is connected to an optical network unit. A first optical signal from the optical fiber is transmitted to the optical module, and the optical module converts the first optical signal into a first electrical signal and transmits the first electrical signal to the optical network unit. A second electrical signal from the optical network unit is transmitted to the optical module, and the optical module converts the second electrical signal into a second optical signal and transmits the second optical signal to the optical fiber. Since information can be transmitted between a plurality of information processing devices through electrical signals, at least one of the plurality of information processing devices is required to be directly connected to the optical module, without all the information processing devices being directly connected to the optical module. Here, the information processing device directly connected to the optical module is called a master monitor of the optical module. In addition, the optical signal input end or the optical signal output end of the optical module may be called an optical port, and the electrical signal input end or the electrical signal output end of the optical module may be called an electrical port.

FIG. 1 is a partial diagram showing a structure of an optical communication system, in accordance with some embodiments. As shown in FIG. 1, the optical communication system mainly includes a remote information processing device 1000, a local information processing device 2000, a master monitor 100, an optical module 200, an optical fiber 101, and a network cable 103.

One end of the optical fiber 101 extends toward the remote information processing device 1000, and the other end of the optical fiber 101 is connected to the optical module 200 through the optical port of the optical module 200. The optical signal can be totally reflected in the optical fiber 101, and the propagation of the optical signal in the direction of the total reflection may almost maintain an original optical power. The optical signal undergoes multiple total reflections in the optical fiber 101, so that the optical signal from the remote information processing device 1000 is transmitted to the optical module 200, or the optical signal from the optical module 200 is transmitted to the remote information processing device 1000, so as to realize the information transmission with long-distance and low power consumption.

The optical communication system may include one or more optical fibers 101, and the optical fibers 101 are detachably connected to the optical module 200. Alternatively, the optical fibers 101 are fixedly connected to the optical module 200. The master monitor 100 is configured to provide data signals to the optical module 200, receive data signals from the optical module 200, or monitor or control the working status of the optical module 200.

The master monitor 100 includes a housing in a substantially cuboid shape, and an optical module interface 102 disposed in the housing. The optical module interface 102 is configured to connect to the optical module 200, so that one-way electrical signal connection or bidirectional electrical signal connection between the master monitor 100 and the optical module 200 is established.

The master monitor 100 also includes an external electrical interface, the external electrical interface may be connected to an electrical signal network. For example, the external electrical interface includes a universal serial bus (USB) interface or a network cable interface 104, and the network cable interface 104 is configured to connect to the network cable 103, so that the one-way electrical signal connection and the bidirectional electrical signal connection between the master monitor 100 and the network cable 103 are established. One end of the network cable 103 is connected to a local information processing device 2000, and the other end of the network cable 103 is connected to the master monitor 100, so as to establish an electrical signal connection between the local information processing device 2000 and the master monitor 100 through the network cable 103. For example, a third electrical signal sent by the local information processing device 2000 is transmitted to the master monitor 100 through the network cable 103, and the master monitor 100 generates a second electrical signal according to the third electrical signal; the second electrical signal from the master monitor 100 is transmitted to the optical module 200, the optical module 200 converts the second electrical signal into a second optical signal, and transmits the second optical signal to the optical fiber 101; and the second optical signal is transmitted to the remote information processing device 1000 in the optical fiber 101. For example, the first optical signal from the remote information processing device 1000 propagates through the optical fiber 101; the first optical signal from the optical fiber 101 is transmitted to the optical module 200; the optical module 200 converts the first optical signal into a first electrical signal and transmits the first electrical signal to the master monitor 100; and the master monitor 100 generates a fourth electrical signal according to the first electrical signal, and transmits the fourth electrical signal to the local information processing device 2000. It will be noted that, the optical module is a tool to realize the mutual conversion of the optical signal and the electrical signal. During the conversion process of the above optical signal and electrical signal, the information does not change, and the encoding and decoding methods of information may change.

In addition to the optical network unit, the master monitor 100 further includes an optical line terminal (OLT), an optical network terminal (ONT), or a data center server.

Figure 2:
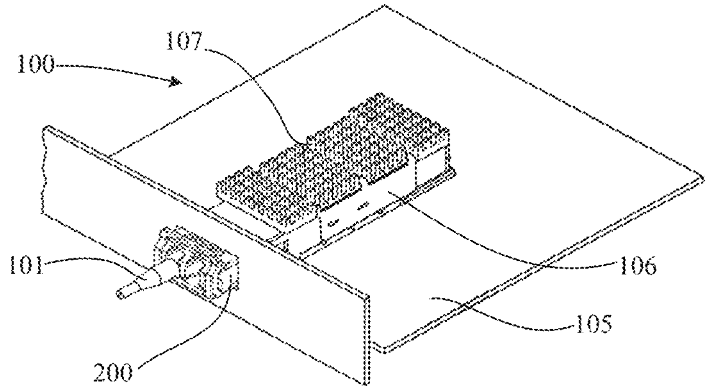
FIG. 2 is a local diagram showing a structure of a master monitor, in accordance with some embodiments.

FIG. 2 is a local diagram showing a structure of a master monitor, in accordance with some embodiments. In order to clearly show a connection relationship between the optical module 200 and the master monitor 100, FIG. 2 only shows structures of the master monitor 100 that are related to the optical module 200. As shown in FIG. 2, the master monitor 100 further includes a PCB circuit board 105 disposed in the housing, a cage 106 disposed on a surface of the PCB circuit board 105, a heat sink 107 disposed on the cage 106, and an electrical connector disposed inside the cage 106. The electrical connector is configured to connect the electrical port of the optical module 200, and the heat sink 107 has protruding structures such as fins for increasing a heat dissipation area.

The optical module 200 is inserted into the cage 106 of the master monitor 100, and the optical module 200 is fixed by the cage 106. Heat generated by the optical module 200 is conducted to the cage 106, and then is dissipated through the heat sink 107. After the optical module 200 is inserted into the cage 106, the electrical port of the optical module 200 is connected to the electrical connector inside the cage 106, so that the bidirectional electrical signal connection is established between the optical module 200 and the master monitor 100. In addition, the optical port of the optical module 200 is connected to the optical fiber 101, so that a bidirectional optical signal connection is established between the optical module 200 and the optical fiber 101.

Figure 3:
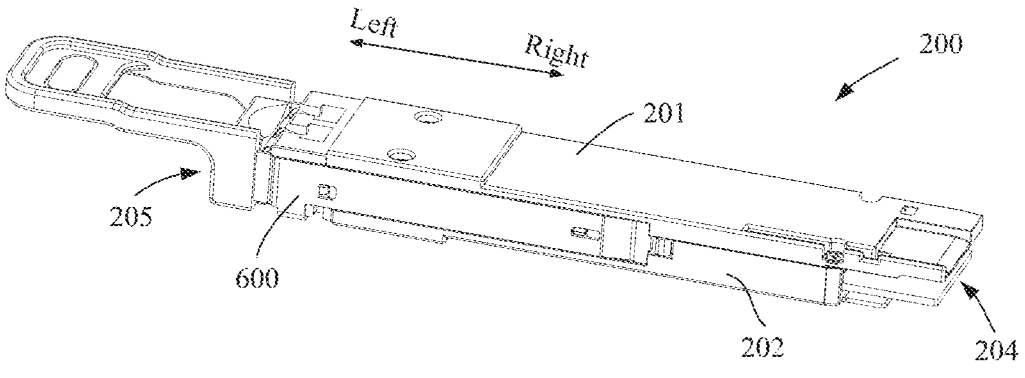
FIG. 3 is a structural diagram of an optical module, in accordance with some embodiments.
Figure 4A:
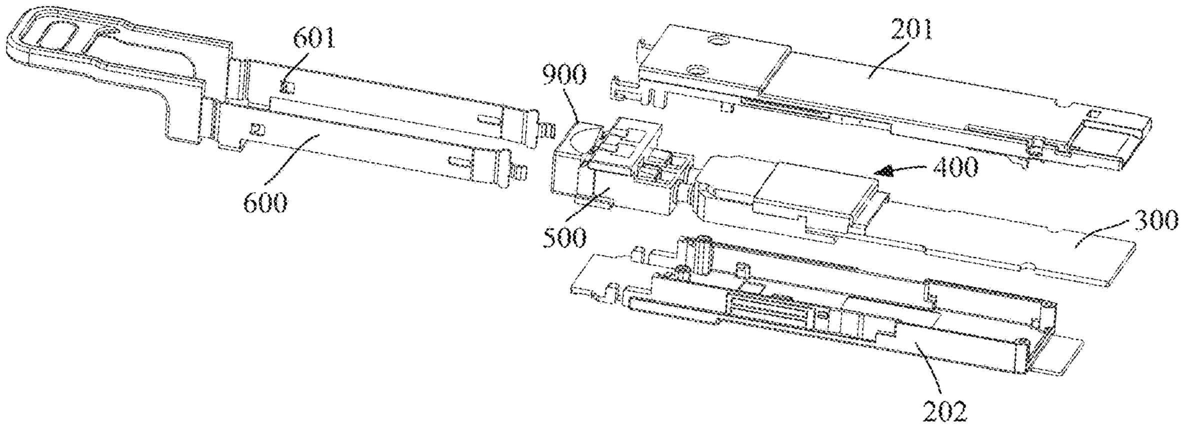
FIG. 4A is an exploded view of an optical module, in accordance with some embodiments.
Figure 4B:
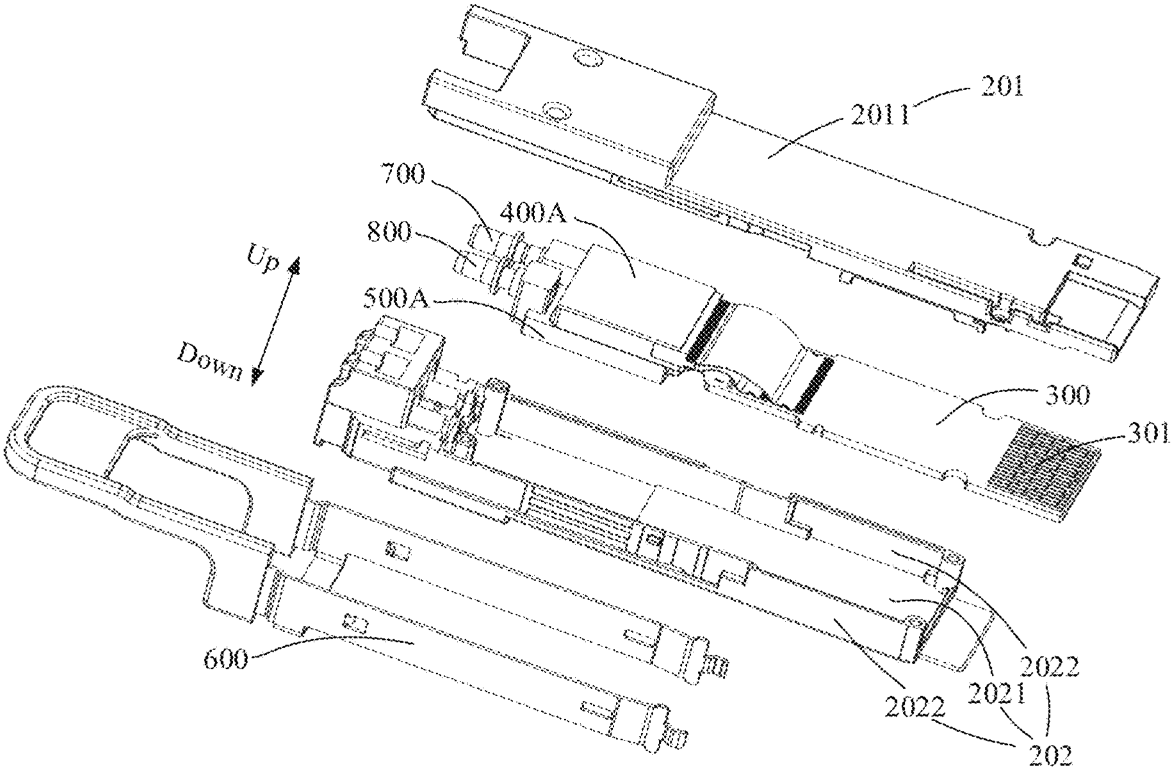
FIG. 4B is an exploded view of another optical module, in accordance with some embodiments.

FIG. 3 is a structural diagram of an optical module, in accordance with some embodiments. FIG. 4A is an exploded view of an optical module, in accordance with some embodiments. FIG. 4B is an exploded view of another optical module, in accordance with some embodiments. As shown in FIGS. 3, 4A, and 4B, the optical module 200 includes a shell, and a circuit board 300, an optical engine 400 and an optical port bracket 500 that are disposed inside the shell. The optical engine 400 includes a light-emitting component 400A and a light-receiving component 500A. However, the present disclosure is not limited thereto. In some embodiments, the optical module 200 includes one of the light-emitting component 400A and a light-receiving component 500A.

The shell includes an upper shell 201 and a lower shell 202. The upper shell 201 is covered on the lower shell 202, so as to form the shell having two openings 204 and 205, and an outer contour of the shell is generally in a cuboid shape.

In some embodiments, the lower shell 202 includes a bottom plate 2021 and two lower side plates 2022 located on both sides of the bottom plate 2021, respectively, and disposed perpendicular to the bottom plate 2021. The upper shell 201 includes a cover plate 2011 and two upper side plates 2010 (referring to FIG. 7) located on both sides of the cover plate 2011, respectively, and disposed perpendicular to the cover plate 2011. The two upper side plates 2010 are combined with the two lower side plates 2022, respectively, so that the upper shell 201 covers the lower shell 202. A direction in which a connecting line between two openings 204 and 205 is located may be the same as a longitudinal direction of the optical module 200 or may not be the same as the longitudinal direction of the optical module 200. For example, the opening 204 is located at an end (a right end in FIG. 3) of the optical module 200, and the opening 205 is also located at an end (a left end in FIG. 3) of the optical module 200. Alternatively, the opening 204 is located at an end of the optical module 200, and the opening 205 is located at a side of the optical module 200. The opening 204 is the electrical port, and a connecting finger 301 of the circuit board 300 extends from the electrical port 204 and is inserted into the electrical connector of the master monitor 100. The opening 205 is the optical port, and the opening 205 is configured to connect the external optical fiber 101, so that the optical fiber 101 is connected to the light-emitting component 400A and a light-receiving component 500A in the optical module 200.

By using an assembly mode of combining the upper shell 201 with the lower shell 202, it is possible to facilitate installation of the circuit board 300, the light-emitting component 400A, or a light-receiving component 500A into the shell, and the upper shell 201 and the lower shell 202 may form encapsulation and protection for these devices. In addition, when the circuit board 300, the light-emitting component 400A, and a light-receiving component 500A are assembled, it is possible to facilitate arrangement of positioning components, heat dissipation components, and electromagnetic shielding components of these devices, which is conducive to implementation of automated production.

In some embodiments, the upper shell 201 and the lower shell 202 are made of a metal material, which is conducive to electromagnetic shielding and heat dissipation.

In some embodiments, the optical module 200 further includes an unlocking component 600 located outside the shell thereof, and the unlocking component 600 is configured to implement a fixed connection between the optical module 200 and the master monitor or to release a fixed connection between the optical module 200 and the master monitor.

For example, the unlocking component 600 is located outside the two lower side plates 2022 of the lower shell 202 and includes an engagement component that is matched with the cage 106 of the master monitor 100. When the optical module 200 is inserted into the cage 106, the optical module 200 is fixed in the cage 106 by the engagement component of the unlocking component 600. When the unlocking component 600 is pulled, the engagement component of the unlocking component 600 moves along with the unlocking component 600, and then a connection relationship between the engagement component and the master monitor is changed, so as to release the fixation between the optical module 200 and the master monitor, so that the optical module 200 may be pulled out of the cage 106.

It will be noted that, in some embodiments of the present disclosure, the structures of the upper shell 201 and the lower shell 202 are different from each other. For example, referring to FIGS. 4A and 4B, in a thickness direction of the shell, a height of the upper side plate 2010 of the upper shell 201 is less than a height of the lower side plate 2022 of the lower shell 202. In this way, it is convenient to dispose the unlocking component 600 outside the lower side plate 2022 of the lower shell 202.

The circuit board 300 includes circuit wirings, electronic elements, and chips, and the electronic element and the chip are connected according to a circuit design through the circuit wiring, so as to implement functions such as power supply, transmission of an electrical signal, and grounding. The electronic element may include, for example, a capacitor, a resistor, a triode, and a metal-oxide-semiconductor field-effect transistor (MOSFET). The chips may include, for example, a microcontroller unit (MCU), a limiting amplifier, a clock and data recovery (CDR) chip, a power management chip, or a digital signal processing (DSP) chip.

The circuit board 300 is generally a rigid circuit board. Due to the relatively hard material of the rigid circuit board, the rigid circuit board can also achieve bearing effects. For example, the rigid circuit board may stably bear the electronic elements and the chips, and the rigid circuit board may also be inserted into the electrical connector in the cage 106 of the master monitor 100.

The circuit board 300 further includes the connecting finger 301 formed on an end surface thereof, and the connecting finger 301 is composed of a plurality of independent pins. The circuit board 300 is inserted into the cage 106, and the circuit board 300 is conducted with the electrical connector in the cage 106 through the connecting finger 301. The connecting finger 301 may be disposed on only one surface (e.g., an upper surface shown in FIG. 4B) of the circuit board 300. Alternatively, the connecting finger 301 may also be disposed on both upper and lower surfaces of the circuit board 300 to provide a larger number of pins, so as to adapt to an occasion where a large number of pins are needed. The connecting finger 301 is configured to establish electrical connection with the master monitor, so as to implement power supply, grounding, inter-integrated circuit (I2C) signal transmission, and data signal transmission. Of course, flexible circuit boards are also used in some optical modules. A flexible circuit board is generally used in conjunction with the rigid circuit board as a supplement to the rigid circuit board.

At least one of the light-emitting component 400A or the light-receiving component 500A is located on a side of the circuit board 300 away from the connecting finger 301.

In some other embodiments, the light-emitting component 400A and the light-receiving component 500A are physically separated from the circuit board 300, respectively, and are each electrically connected to the circuit board 300 through the corresponding flexible circuit board or electrical connecting member, respectively.

In some embodiments, at least one of the light-emitting component 400A or the light-receiving component 500A may be directly disposed on the circuit board 300. For example, at least one of the light-emitting component 400A or the light-receiving component 500A may be disposed on the surface of the circuit board 300 or the side of the circuit board 300.

In addition, in order to realize the connection between the optical module and the external optical fiber, it is usually necessary to provide a structure matching the external optical fiber (e.g., an optical fiber adapter) at the upper shell 201, the lower shell 202, and the optical interface. The optical fiber adapter generally has a standard shape and size, so as to facilitate the assembly of the external optical fiber connectors. The optical fiber adapter includes one or a plurality of optical fiber interfaces, for example, the plurality of optical fiber interfaces include interfaces for outgoing optical signals and interfaces for incoming optical signals. Common optical fiber connectors are, for example, lucent connectors (LC, optical patch cable connector). In this way, by inserting the optical fiber connector into the optical fiber adapter of the optical module, an optical signal inside the optical module may be transmitted into the external optical fiber, and an optical signal outside the optical module may be transmitted into the optical module.

In some embodiments, the optical module 200 further includes an internal optical fiber, the optical engine 400 is disposed on the lower shell 202, the optical engine 400 may be connected to one end of the optical fiber adapter through the internal optical fiber, and the other end of the optical fiber adapter is fixedly connected to the optical port bracket 500. In a case where the lower shell 202 and the optical port bracket 500 are integrated, since the internal optical fiber cannot be bent, and the size of the internal optical fiber connecting the optical fiber adapter to the optical engine 400 is difficult to control, after the optical fiber adapter is connected to the optical engine 400 through the internal optical fiber, it is difficult to assemble the other end of the optical fiber adapter with the optical port bracket 500, which makes the installation of the optical fiber adapter more complicated.

Of course, in some embodiments, the optical engine 400 may also be connected to one end of the optical fiber adapter, that is, an end surface of the optical engine 400 is in direct contact with one end of the optical fiber adapter, and the other end of the optical fiber adapter is fixedly connected to the optical port bracket 500. In a case where the lower shell 202 and the optical port bracket 500 are integrated, it is difficult to insert the other end of the optical fiber adapter connected to the optical engine 400 into the optical port bracket 500, which makes the installation of the optical fiber adapter more complicated.

In order to solve the above problems, in some embodiments of the present disclosure, the lower shell 202 of the optical module is separated from the optical port bracket 500. When installing, firstly, the optical engine 400 is installed on the lower shell 202, the optical fiber adapter is connected to the optical engine 400 through the internal optical fiber, or after the optical fiber adapter is abutted with the optical engine 400, and then the optical port bracket 500 is installed on the lower shell 202. In this way, the installation of the optical fiber adapter may be simplified.

Figure 5:
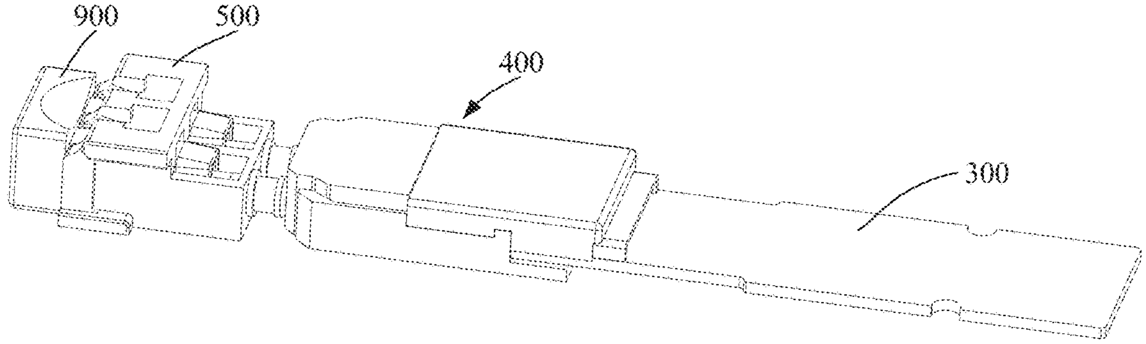
FIG. 5 is an assembly diagram of a circuit board, an optical engine, an optical port bracket, and an optical port plug in an optical module, in accordance with some embodiments.
Figure 6:
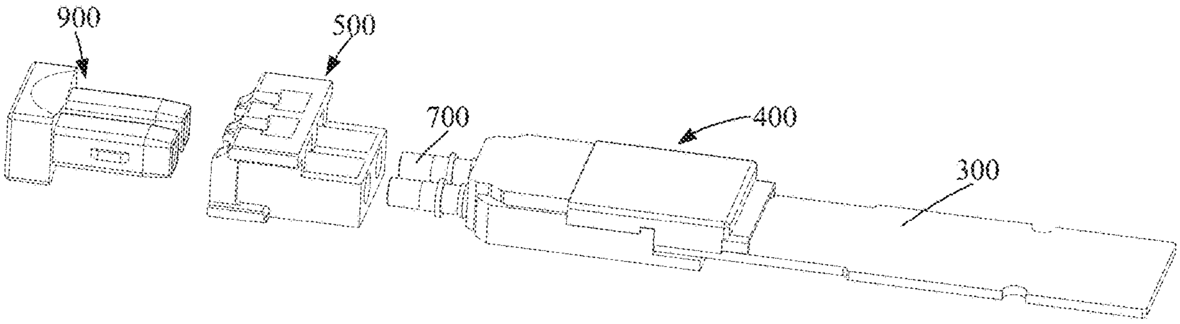
FIG. 6 is an exploded view of a circuit board, an optical engine, an optical port bracket, and an optical port plug in an optical module, in accordance with some embodiments.

FIG. 5 is an assembly diagram of the circuit board, the optical engine, the optical port bracket, and the optical port plug in an optical module, in accordance with some embodiments. FIG. 6 is an exploded view of the circuit board, the optical engine, the optical port bracket, and the optical port plug in the optical module, in accordance with some embodiments. As shown in FIGS. 5 and 6, the optical module 200 further includes a first optical fiber adapter 700. The first optical fiber adapter 700 is located at the optical port formed by the upper shell 201 and the lower shell 202, and the connection between the optical module 200 and the external optical fiber may be realized through the first optical fiber adapter 700.

In some embodiments, the lower shell 202 is separated from the optical port bracket 500. After the optical engine 400 is installed on the circuit board 300, the optical engine 400 is connected with one end of the first optical fiber adapter 700, the other end of the first optical fiber adapter 700 is connected with the optical port bracket 500, then the optical port bracket is installed on one end of the upper shell 201, and then the lower shell 202 is covered on the upper shell 201, so that the optical port bracket 500 is located at the optical port formed by the upper shell 201 and the lower shell 202.

In some embodiments, the optical module further includes an optical port plug 900. In a case where the optical module is used, an external optical fiber may be connected to the first optical fiber adapter 700 through the optical port bracket 500, so as to realize light emission or reception. In a case where the optical module is out of use, the optical port plug 900 may be inserted into the optical port bracket 500, so as to prevent dust from entering the optical module through the optical port of the optical port bracket 500.

Figure 7:
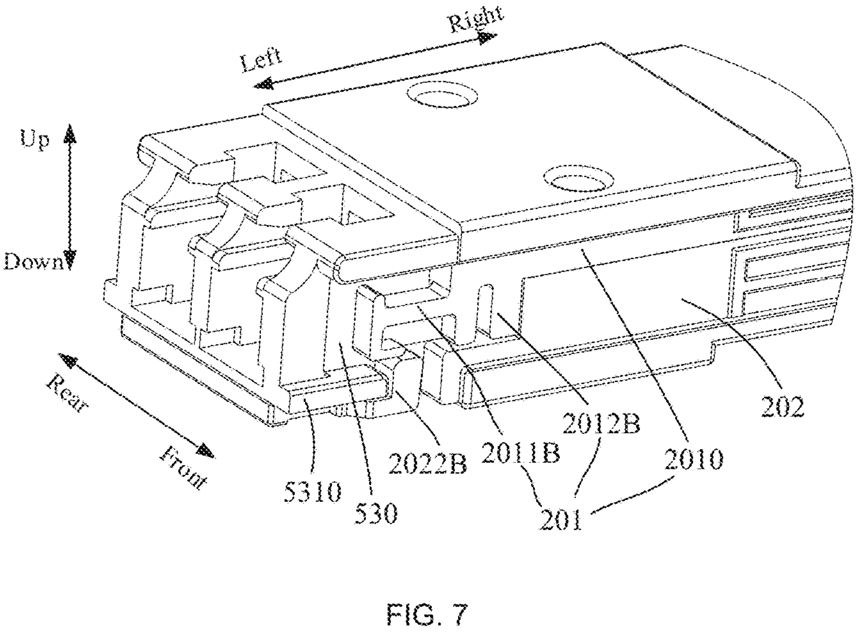
FIG. 7 is a local assembly diagram of an upper shell, a lower shell, and an optical port bracket in an optical module, in accordance with some embodiments.
Figure 10:
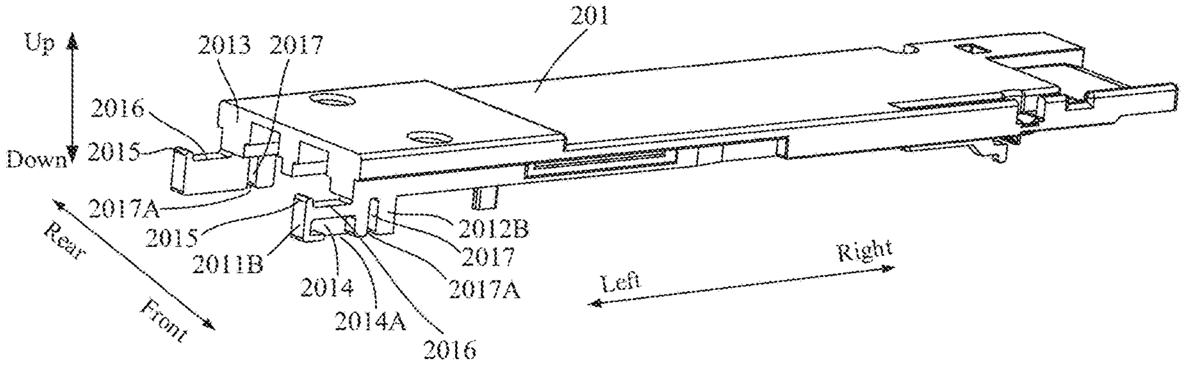
FIG. 10 is a structural diagram of an upper shell in an optical module, in accordance with some embodiments.

FIG. 7 is a local assembly diagram of the upper shell, the lower shell, and the optical port bracket in an optical module, in accordance with some embodiments. In some embodiments, the upper shell 201 further includes one or more first limiting members 2011B (e.g., limiting support arms), and the first limiting member 2011B is connected to the upper side plate 2010. For example, as shown in FIGS. 7 and 10, the upper shell 201 includes two first limiting members 2011B, and the two first limiting members 2011B are respectively disposed at an end (e.g., the left end)

proximate to the optical port bracket 500 of the corresponding upper side plate 2010. The first limiting member 2011B protrudes from the left side surface of the upper shell 201. The side surface of the optical port bracket 500 proximate to the upper shell 201 is connected to the upper shell 201. For example, the side surface of the optical port bracket 500 proximate to the upper shell 201 contacts or abuts against the upper shell 201. When the upper shell 201 is assembled with the optical port bracket 500, the two first limiting members 2011B of the upper shell 201 abut against two opposite side surfaces of the optical port bracket 500, and the two first limiting members 2011B and the two opposite side surfaces of the optical port bracket the 500 are bonded with adhesive to fix the optical port bracket 500 to the upper shell 201, so as to realize the position limitation of the optical port bracket 500 in a front-rear direction.

In some embodiments, the two first limiting members 2011B may be symmetrically disposed on the end of the corresponding upper side plate 2010 proximate to the optical port bracket 500, so that the force can be balanced, and the assembly error can be reduced. However, the present disclosure is not limited thereto.

Figure 12:
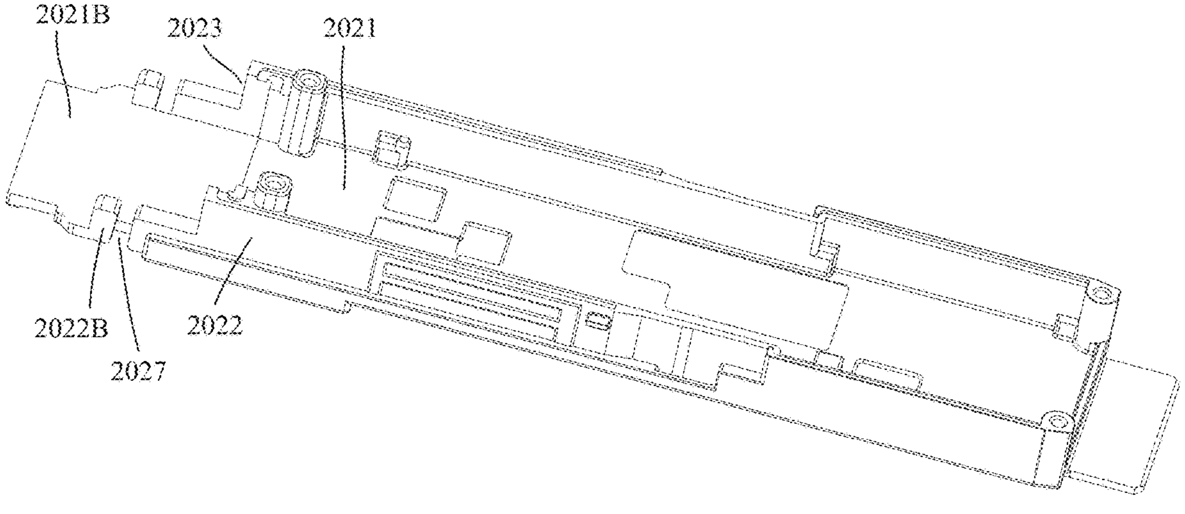
FIG. 12 is a structural diagram of a lower shell in an optical module, in accordance with some embodiments.

In some embodiments, the lower shell 202 further includes one or more first limiting bosses 2022B, and the first limiting boss 2022B is disposed on an end of the lower side plate 2022 proximate to the optical port bracket 500. For example, as shown in FIGS. 7 and 12, the lower shell 202 includes two first limiting bosses 20228, and the two first limiting bosses 2022B are disposed on an end of the corresponding lower side plates 2022 proximate to the optical port bracket 500.

In some embodiments, the two first limiting bosses 2022B may be symmetrically disposed on the end of the corresponding lower side plates 2022 proximate to the optical port bracket 500, so that the force can be balanced and the assembly error can be reduced. However, the present disclosure is not limited thereto.

The optical port bracket 500 includes one or more second limiting bosses 5310. In some embodiments, the optical port bracket 500 includes two second limiting bosses 5310, and the two second limiting bosses 5310 are respectively disposed on two opposite side surfaces of the optical port bracket 500.

The side surface of the second limiting boss 5310 proximate to the optical engine 400 abuts against the first limiting boss 2022B, so as to limit the rightward movement of the optical port bracket 500. The side surface of the second limiting boss 5310 proximate to the lower shell 202 abuts against an inner bottom surface of the lower shell 202, so as to support the optical port bracket 500 through the lower shell 202, so that the downward movement of the optical port bracket 500 may be limited. The optical port bracket 530 is placed on the inner bottom surface of the lower shell 202, and the inner bottom surface of the lower shell 202 supports the optical port bracket 500. In this way, the optical port bracket 500 can be moved from left to right until the second limiting boss 5310 of the optical port bracket 500 contacts the first limiting boss 2022B of the lower shell 202.

Figure 8:
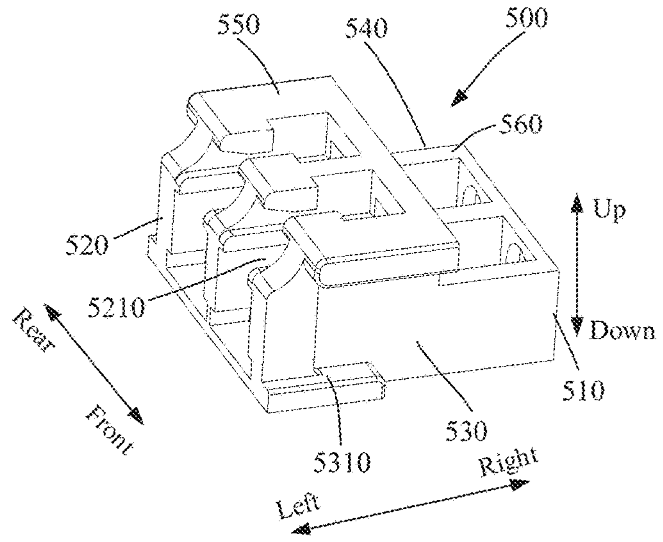
FIG. 8 is a structural diagram of an optical port bracket in an optical module, in accordance with some embodiments.
Figure 9:
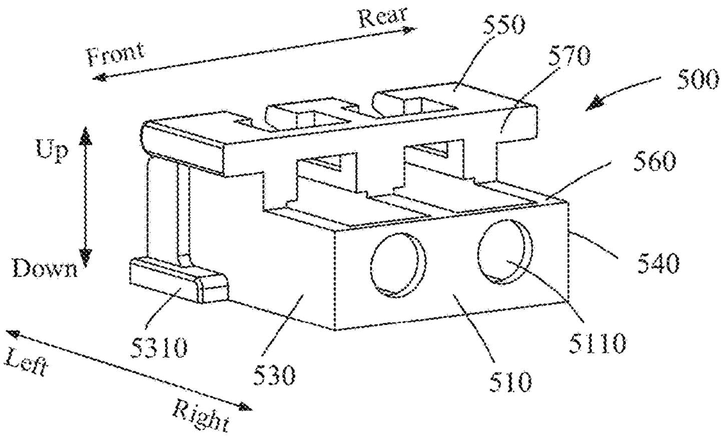
FIG. 9 is a structural diagram of an optical port bracket in an optical module from another perspective, in accordance with some embodiments.

FIG. 8 is a structural diagram of the optical port bracket in an optical module, in accordance with some embodiments. FIG. 9 is the structural diagram of the optical port bracket in an optical module from another perspective, in accordance with some embodiments.

As shown in FIGS. 8 and 9, the optical port bracket 500 includes a first side wall 510, a second side wall 520, a third side wall 530, and a fourth side wall 540. The first side wall 510 is disposed opposite to the second side wall 520, and the first side wall 510 is closer to the optical engine 400 than the second side wall 520. The third side wall 530 is disposed opposite to the fourth side wall 540, and the third side wall 530 is connected to the first side wall 510 and the second side wall 520, and the fourth side wall 540 is connected to the first side wall 510 and the second side wall 520.

The optical port bracket 500 further includes a first surface and a second surface, the first surface is opposite to the second surface, and the first surface is closer to the upper shell 201 than the second surface. The first surface includes a first sub-surface 550 and a second sub-surface 560, and the second sub-surface 560 is closer to the lower shell 201 than the first sub-surface 550.

For example, the first side wall 510 is the right side wall of the optical port bracket 500, the second side wall 520 is the left side wall of the optical port bracket 500, the third side wall 530 is the front side wall of the optical port bracket 500, the fourth side wall 540 is the rear side wall of the optical port bracket 500, the first surface is the upper surface of the optical port bracket 500, and the second surface is the lower surface of the optical port bracket 500.

The optical port bracket 500 further includes a mounting hole 5110 and a slot 5210, and the mounting hole 5110 is disposed in the first side wall 510. For example, the mounting hole 5110 may penetrate the first side wall 510 along a thickness direction. The slot 5210 penetrates the second side wall 520 and extends toward a direction proximate to the first side wall 510, and the slot 5210 communicates with the mounting hole 5110. The first optical fiber adapter 700 is inserted into the slot 5210 through the mounting hole 5110, so that the first optical fiber adapter 700 is connected with the optical port bracket 500. The slot 5210 of the optical port bracket 500 has an opening, so that an external optical fiber may be inserted into the slot 5210 through the opening of the slot 5210, and the external optical fiber is connected with the optical port bracket 500.

Figure 11:
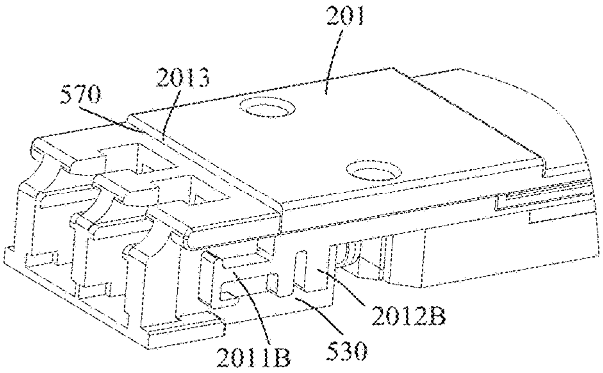
FIG. 11 is a local assembly diagram of an upper shell, an optical engine, an optical fiber adapter, and an optical port bracket in an optical module, in accordance with some embodiments.

FIG. 10 is a structural diagram of the upper shell in an optical module, in accordance with some embodiments. FIG. 11 is a local assembly diagram of the upper shell, the optical engine, the optical fiber adapter, and the optical port bracket in an optical module, in accordance with some embodiments. As shown in FIGS. 10 and 11, the first limiting member 2011B protrudes from the left side surface 2013 of the upper shell 201 and extends from the left side surface 2013 of the upper shell 201 along a left-right direction. In some embodiments, a first protrusion 2015 and a second groove 2016 are provided on an end (e.g., the upper end) of the first limiting member 2011B away from the lower shell 202. In a direction of the first limiting member 2011B away from the lower shell of 202, the first protrusion 2015 protrudes from the second groove 2016.

For ease of description, the following is mainly described by considering an example in which the upper shell 2011B includes two first limiting members 2011B. However, this cannot be understood as a limitation to the present disclosure. In a case where the upper shell 201 is fixedly connected to the optical port bracket 500, the optical port bracket 500 is placed between the two first limiting members 2011B. The opposite side surfaces of the two first limiting members 2011B abut against the third side wall 530 and the fourth side wall 540 of the optical port bracket 500, respectively, so as to limit the optical port bracket 500 in the front-rear direction through the first limiting member 2011B. After the side surfaces of the two first limiting members 2011B are in contact with the third side wall 530 and the fourth side wall 540 of the optical port bracket 500, respectively, an adhesive is injected into a gap between one first limiting member 2011B and the third side wall 530 and a gap between the other first limiting member 2011B and the fourth side wall 540, respectively, and the adhesive is injected into the second groove 2016. Thus, the side surfaces of the two first limiting members 2011B are bonded to the third side wall 530 and the fourth side wall 540 of the optical port bracket 500, thereby realizing the fixed connection between the optical port bracket 500 and the upper shell 201.

It will be noted that, in a case where the first protrusion 2015 and the second groove 2016 are provided on the first limiting member 2011B, in one aspect, the bonding area of the adhesive is increased. In another aspect, when a large amount of adhesive is injected, the second groove 2016 may be used as an adhesive accommodating groove, so as to accommodate the adhesive overflowing from between the first limiting member 2011 and the third side wall 530, or between the first limiting member 2011B and the fourth side wall 540, thereby avoiding adhesive contamination of other structures.

In some embodiments, the optical port bracket 500 further includes a fifth side wall 570 (referring to FIG. 9), and the fifth side wall 570 is connected to the first sub-surface 550 and the second sub-surface 560, respectively, and the fifth side wall 570 is parallel to the first side wall 510. For example, in a left-right direction, the fifth side wall 570 is recessed from the first side wall 510. In a case where the upper shell 201 is connected to the upper side surface of the optical port bracket 500, the inner bottom surface of the upper shell 201 abuts against the second sub-surface 560 of the optical port bracket 500, so as to support the upper shell 201 through the second sub-surface 560. The left side surface 2013 of the upper shell 201 abuts against the fifth side wall 570 of the optical port bracket 500.

In some embodiments, firstly, the optical port bracket 500 is placed between the two first members 2011B of the upper shell 201, then, the optical port bracket 500 is moved from left to right, so that the third side wall 530 and the fourth side wall 540 of the optical port bracket 500 are in contact with the side surfaces of the two first members 20118, respectively; the optical port bracket 500 is continually moved to the right until the fifth side wall 570 of the optical port bracket 500 abuts against the left side surface 2013 of the upper shell 201; and finally, the adhesive is injected between the contact surface of the optical port bracket 500 and the first member 2011B, and the optical port bracket 500 is fixed on the upper shell 201 by means of the adhesive.

It can be understood that, since the adhesive generally has a certain elasticity, compared with the fixing formed by metal integration, the adhesive can absorb a certain dimensional error For example, the adhesive may allow a position movement between the optical port bracket 500 and the first limiting member 2011B, providing a small range of adjustable dimensions, which is still easy to assemble in the presence of the certain dimensional error. Thus, it is conducive to improving an assembly accuracy among the upper shell 201, the lower shell 202, and the optical port bracket 500, thereby reducing the installation error of the optical engine.

In some embodiments, a first groove 2014 is provided on a side of a corresponding side wall (e.g., the third side wall 530 or the fourth side wall 540) of the first limiting member 2011B away from the optical port bracket 500. For example, the first groove 2014 located on the rear side of the upper shell is recessed from the rear side surface of the first limiting member 2011B to the front side surface of the first limiting member 2011B, the depth of the first groove 2014 in the front-rear direction is less than the thickness of the first limiting member 2011B in the front-rear direction, and the length of the first groove 2014 in the left-right direction is less than the length of the first limiting member 2011B.

It will be noted that, the structure of the first groove 2014 located at the front side of the upper shell is similar to the structure of the first groove 2014 located at the rear side of the upper shell. The size of the first groove 2014 located at the front side of the upper shell is equal to the size of the first groove 2014 located at the rear side of the upper shell, and the details will not be repeated herein.

As shown in FIG. 4A, the unlocking component 600 includes a spring, an elastic piece 601, and an unlocking handle. The spring is disposed in the first groove 2014 (referring to FIG. 10), and the two ends of the spring abut against side walls opposite to each other in the left-right direction of the first groove 2014. The unlocking component 600 includes two elastic pieces 601 oppositely disposed on the two unlocking handles.

In some embodiments, as shown in FIG. 10, the side wall of the first groove 2014 proximate to the lower shell 202 is at least partially opened, so as to form a first notch 2014A, and a plane where the first notch 2014A is located and the lower surface of the first member 2011B are coplanar. In a case where the unlocking component 600 is assembled on the upper shell 201, the elastic piece 601 on the unlocking handle is assembled into the first groove 2014 of the upper shell 201 through the first notch 2014A and contacts with the spring in the first groove 2014. When the unlocking component 600 moves left and right, the elastic piece 601 moves left and right in the first groove 2014 to stretch or compress the spring, so as to realize the fixed connection between the optical module and the master monitor, or release the fixed connection between the optical module and the master monitor.

In some embodiments, the third side wall 530 of the optical port bracket 500 is provided with a second limiting boss 5310, and the second limiting boss 5310 extends in the front-rear direction away from the third side wall 530, so that the second limiting boss 5310 protrudes from the third side wall 530. Similarly, the fourth side wall 540 of the optical port bracket 500 is provided with the second limiting boss, and the second limiting boss extends in the front-rear direction away from the fourth side wall 540, so that the second limiting boss protrudes from the fourth side wall 540.

For example, a second limiting boss 5310 is provided on the third side wall 530 of the optical port bracket 500, and a second limiting boss is provided on the fourth side wall 540 of the optical port bracket 500. However, the present disclosure is not limited thereto.

Figure 13:
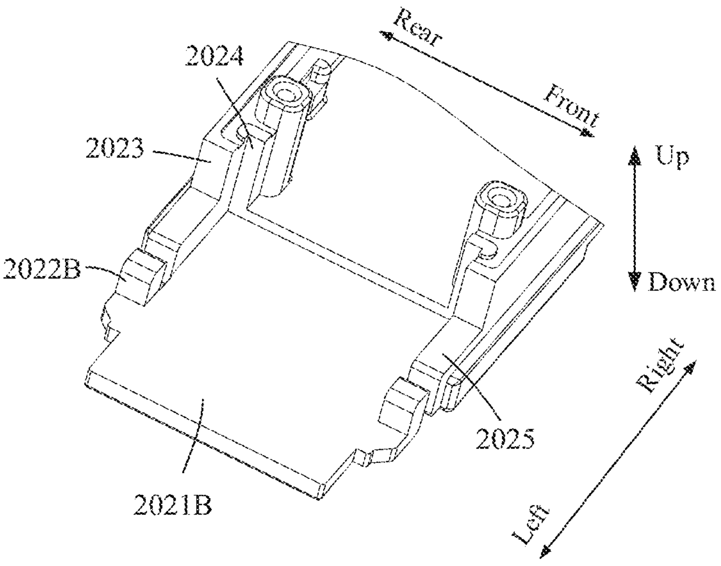
FIG. 13 is a local diagram showing a structure of a lower shell in an optical module from another perspective, in accordance with some embodiments.

FIG. 12 is a structural diagram of the lower shell in an optical module, in accordance with some embodiments. FIG. 13 is a local diagram showing a structure of the lower shell in an optical module from another perspective, in accordance with some embodiments. As shown in FIGS. 12 and 13, the lower shell 202 includes two first limiting bosses 2022B, and the two first limiting bosses 2022B are respectively disposed on the inner bottom surface 2021B of the lower shell 202, so as to define an opening on the left side of the lower shell 202 through the two first limiting bosses 2022B. The lower shell 202 further includes a fourth notch 2027, the fourth notch 2027 is provided between the first limiting boss 2022B and the corresponding lower side plate 2022. In addition, in a thickness direction of the optical module 200, the fourth notch 2027 is opposite to the first notch 2014A of the first groove 2014 (referring to FIG. 7), so as to allow the elastic piece 601 to be assembled to the first notch 2014A through the fourth notch 2027 and the first notch 2014A.

In some embodiments, the two first limiting bosses 2022B are symmetrically disposed on the inner bottom surface 2021B of the lower shell 202.

Referring to FIG. 7, when assembling the lower shell 202, the upper shell 201, and the optical port bracket 500, the optical port bracket 500 is placed between the two first limiting bosses 2022B, and then the lower shell 202 is connected to the upper shell 201 from bottom to top, so that the second limiting boss 5310 abuts against the corresponding first limiting boss 2022B in the left-right direction, and the side surface of the first limiting member 2011B proximate to the lower shell 202 abuts against the side surface of the first limiting boss 2022B proximate to the upper shell 201, and the side surface of the optical port bracket 500 proximate to the lower shell 202 abuts against the inner bottom surface 2021B of the lower shell 202 in the up-down direction.

Thus, the limitation of the optical port bracket 500 in the front-rear direction may be realized through the two first limiting members 2011B, the limitation of the optical port bracket 500 in an up-down direction may be realized through the abutment of the side surface of the first limiting member 2011B proximate to the lower shell 202 and the side surface of the first limiting boss 2022B proximate to the upper shell 201, and the rightward movement of the optical port bracket 500 may be limited through the abutment of the second limiting boss 5310 and the first limiting boss 2022B.

In some embodiments, the side surface (e.g., the left side surface) of the first limiting boss 20228 proximate to the optical port bracket 500 is a plane. In a case where the lower shell 202 is connected to the optical port bracket 500, the side surface of the first limiting boss 2022B proximate to the optical port bracket 500 abuts against the second limiting boss 5310, so as to limit the leftward movement of the lower shell 202. The opposite side surfaces of the two first limiting bosses 20228 in the front-rear direction are also planes. In this way, after the optical port bracket 500 is assembled with the lower shell 202, and the opposite side surfaces of the two first limiting bosses 20228 may abut against the third side wall 530 and the fourth side wall 540, respectively.

Of course, in some embodiments, there may also be gaps between the opposite side surfaces of the two first limiting bosses 2022B and the third side wall 530 and the fourth side wall 540, so as to facilitate the insertion of the optical port bracket 500 into the lower shell 202. The gap may be adaptively set as need.

In some embodiments, referring to FIG. 13, a plurality of second limiting members 2024 are provided on the two opposite lower side plates of the lower shell 202, each second limiting member 2024 protrudes inwardly from the lower side plate of the lower shell 202, and the side surface (e.g., the left surface) of the second limiting member 2024 proximate to the optical port bracket 500 is a plane. In the case where the lower shell 202 is connected to the optical port bracket 500, the first side wall 510 abuts against the second limiting member 2024, so as to limit the leftward movement of the lower shell 202 through the second limiting member 2024.

Figure 14:
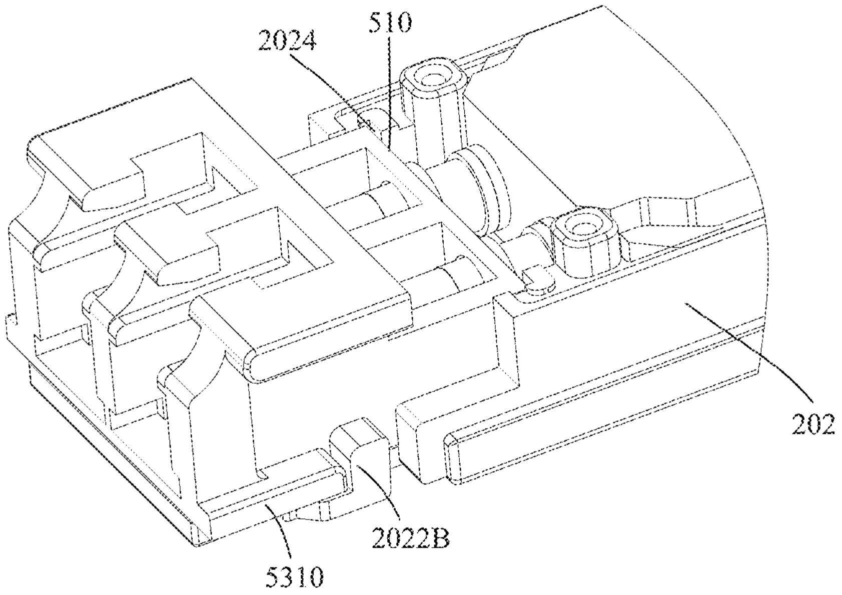
FIG. 14 is a local assembly diagram of a lower shell, an optical engine, an optical fiber adapter, and an optical port bracket in an optical module, in accordance with some embodiments.

FIG. 14 is a local assembly diagram of the lower shell, the optical engine, the optical fiber adapter, and the optical port bracket in an optical module, in accordance with some embodiments. As shown in FIG. 14, when the lower shell 202 is assembled with the optical port bracket 500, the optical port bracket 500 is placed between the two first limiting bosses 20228 of the lower shell 202, so that the side surface of the second limiting boss 5310 proximate to the optical engine 400 (e.g., the right side surface) is in contact with the side surface of the first limiting boss 2022B away from the optical engine 400 (e.g., the left side surface), and the first side wall 510 is in contact with the second limiting member 2024. Then, the lower shell 202 is moved upward until the side surface (e.g., the lower surface) of the optical port bracket 500 proximate to the lower shell 202 abuts against the inner bottom surface 2021B of the lower shell 202, the side surface of the first limiting boss 2022B away from the optical engine 400 abuts against the side surface of the second limiting boss 5310 on the optical port bracket 500 proximate to the optical engine 400, and the first side wall 510 of the optical port bracket 500 abuts against the second limiting member 2024 of the lower shell 202.

For example, the side surface of the second limiting boss 5310 proximate to the upper shell 201 is a plane. When the lower shell 202 is covered with the upper shell 201, the side surface of the first limiting member 2011B proximate to the lower shell 202 abuts against the side surface of the second limiting boss 5310 proximate to the upper shell 201, so that the upward movement of the lower shell 202 may be limited through the first limiting member 2011B.

In some embodiments, the upper shell 201 further includes one or more limiting columns 2012B. As shown in FIG. 10, the upper shell 201 includes two limiting columns 20128, and the two limiting columns 2012B are disposed on the upper side plates of the upper shell 201. In some embodiments, the two limiting columns 2012B may be symmetrically disposed on the corresponding upper side plates of the upper shell 201. In this way, the force can be balanced and the assembly error can be reduced.

However, the present disclosure is not limited thereto. In some embodiments, the limiting column 2012B may be connected with the first limiting member 2011B. Alternatively, the limiting column 2012B may be independently disposed on the upper side plate of the upper shell 201.

As shown in FIG. 13, the lower shell 202 further includes a plurality of first limiting surfaces 2023, and the plurality of first limiting surfaces 2023 are respectively disposed on the two opposite lower side plates of the lower shell 202. The plurality of first limiting surfaces 2023 are proximate to the optical port bracket 500, and a size of the first limiting surface 2023 in the front-rear direction is the same as a thickness of the lower side plate of the lower shell 202 in the front-rear direction. When the lower shell 202 is covered on the upper shell 201, the limiting column 20128 abuts against the first limiting surface 2023, so as to limit the lower shell 202 in the left-right direction through the cooperation between the limiting column 2012B and the first limiting surface 2023.

For example, as shown in FIG. 13, a plurality of second limiting surfaces 2025 are provided on the two opposite lower side plates of the lower shell 202. The plurality of second limiting surfaces 2025 are proximate to the upper shell 201. The plurality of first limiting surface 2023 are respectively connected with the plurality of second limiting surfaces 2025 correspondingly. In this way, when the lower shell 202 is covered on the upper shell 201, the side surface of the first limiting member 2011B proximate to the lower shell 202 and the side surface of the limiting column 2012B proximate to the lower shell 202 each abut against the second limiting surface 2025, so that the upper shell 201 is fixed on the lower shell 202 through the first limiting member 2011B and the limiting column 2012B.

In some embodiments, referring to FIG. 10, the upper shell 201 further includes a through groove 2017. The through groove 2017 is disposed between the first limiting member 2011B and the corresponding limiting column 2012B. Along the front-rear direction (that is, the thickness direction of the upper side plate), the through groove 2017 penetrates the corresponding upper side plate. An end of the through groove 2017 proximate to the lower shell 202 is at least partially open, so as to form a second notch 2017A. The plane where the second notch 2017A is located, the lower surface of the first limiting member 2011B, and the lower surface of the limiting column 20128 are coplanar. In this way, by providing the through groove 2017 and the second notch 2017A on the upper shell 201, the hardness of the first limiting member 2011B may be reduced. In a case where the first limiting member 2011B is squeezed, the first limiting member 2011B may slightly move in the left-right direction, so that the first limiting member 2011B has a certain degree of elasticity, so as to prevent the first limiting member 2011B from being damaged due to being squeezed.

Generally, the lower shell 202 is an assembly carrier of the circuit board 300 and the optical engine 400, and there are many components interfering with each other Some embodiments of the present disclosure provide a flat lower shell 202 with a simple structure, which may reduce the difficulty of assembly. In addition, since the first limiting member 2011B and the limiting column 2013B are disposed on the upper shell 201, the complexity of the structure of the lower shell 202 may be reduced, thus the design and processing difficulty of the lower shell 202 is reduced.

In some embodiments, when assembling the optical module 200, firstly, the optical engine 400 (e.g., the light-emitting component 400A and the light-receiving component 500A) is installed on the circuit board 300; then, the first optical fiber adapter 700 is connected to the optical engine 400 through the internal optical fiber, or the first optical fiber adapter 700 is connected to the optical engine 400; then, the optical port bracket 500 is placed between the two first limiting members 2011B of the upper shell 201, the upper shell 201 is moved, so that the fifth side wall 570 of the optical port bracket 500 is in contact with the left side surface 2013 of the upper shell 201, and the third side wall 530 and fourth side wall 540 of the optical port bracket 500 abut against the two first limiting members 2011B of the upper shell 201; the adhesive is injected into the gap between the optical port bracket 500 and the first limiting member 2011B, and the optical port bracket 500 is fixed on the upper shell 201 through the adhesive; the lower shell 202 is moved, so that the side surface of the first limiting boss 20228 away from the optical engine 400 is in contact with the side surface of the second limiting boss 5310 proximate to the optical engine 400, the second limiting member 2024 is in contact with the first side wall 510, the inner bottom surface 2021B of the lower shell 202 is in contact with the side surface of the optical port bracket 500 proximate to the lower shell 202, the side surface of the first limiting member 20118 proximate to the lower shell 202 is in contact with the side surface of the first limiting boss 2022B proximate to the upper shell 201, and the limiting column 20128 is in contact with the first limiting surface 2023 and the second limiting surface 2025; the spring is embedded in the first groove 2014 of the first limiting member; and the unlocking handle of the unlocking component 600 is disposed on the outer sides of the upper shell 201 and the lower shell 202, so that the elastic piece 601 on the unlocking handle is inserted into the first groove 2014 of the first limiting 2011B and connected with the spring. In the above assembly manner, the optical port bracket 500 is fixed at the optical port formed by the upper shell 201 and the lower shell 202.

It will be noted that, in some embodiments, the adhesive may further be injected between the optical port bracket 500 and the inner bottom surface 2021B of the lower shell 202, so as to fix the optical port bracket 500 on the lower shell 202 through the adhesive.

Figure 15:
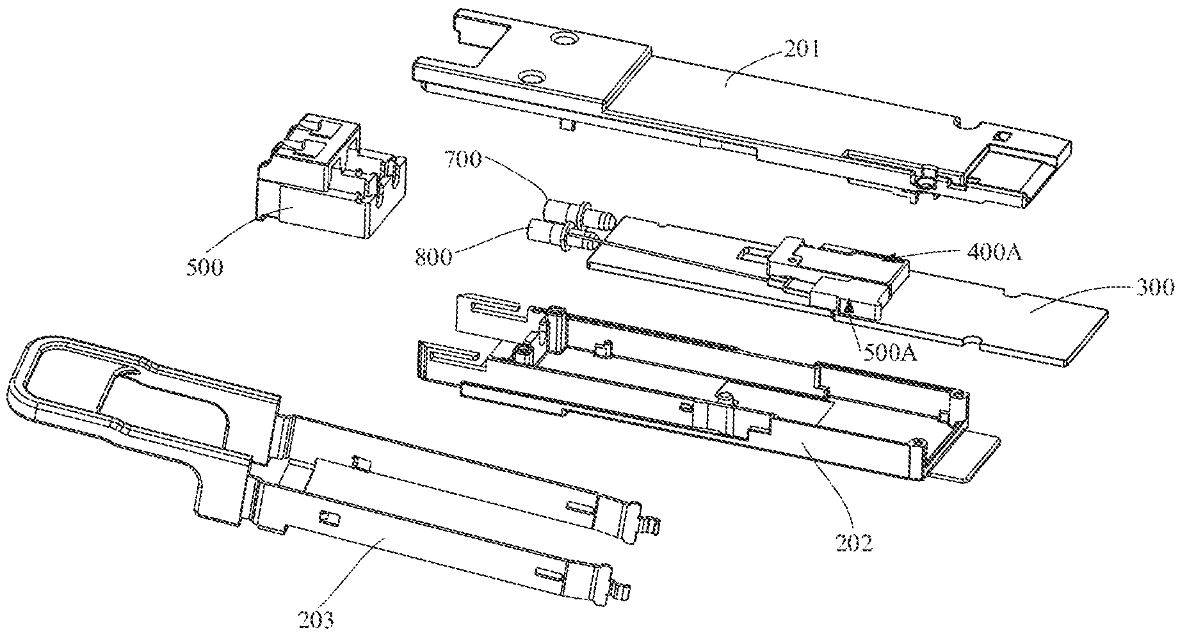
FIG. 15 is an exploded view of yet another optical module, in accordance with some embodiments.

FIG. 15 is an exploded view of another optical module, in accordance with some embodiments. As shown in FIG. 15, in some embodiments, the light-emitting component 400A and the light-receiving component 500A may be connected to one end of the optical fiber adapter through the internal optical fiber, and the other end of the optical fiber adapter is fixedly connected to the optical port bracket 500. In some embodiments, the light-emitting component 400A and the light-receiving component 500A may also be connected to one end of the optical fiber adapter, that is, an end surface of the optical engine is in direct contact with one end of the optical fiber adapter, and the other end of the optical fiber adapter is fixedly connected to the optical port bracket 500.

Figure 16:
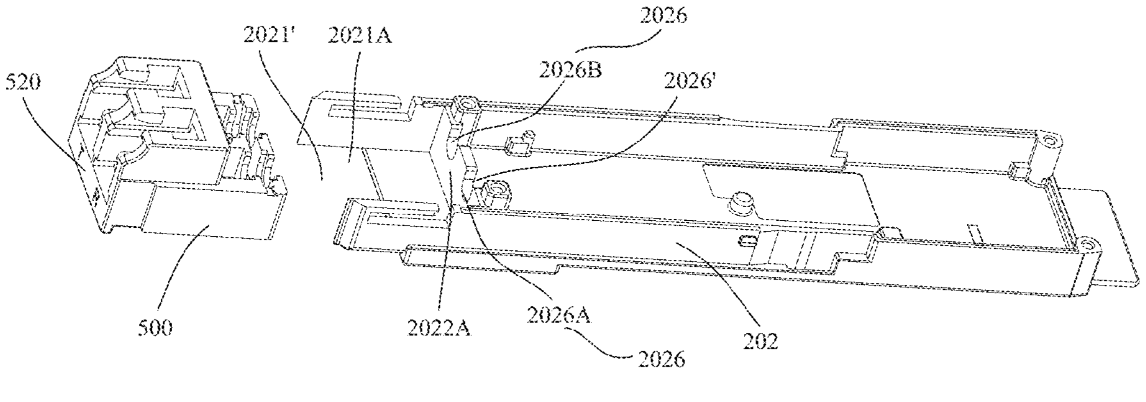
FIG. 16 is an exploded view of a lower shell and an optical port bracket in yet another optical module, in accordance with some embodiments.
Figure 17:
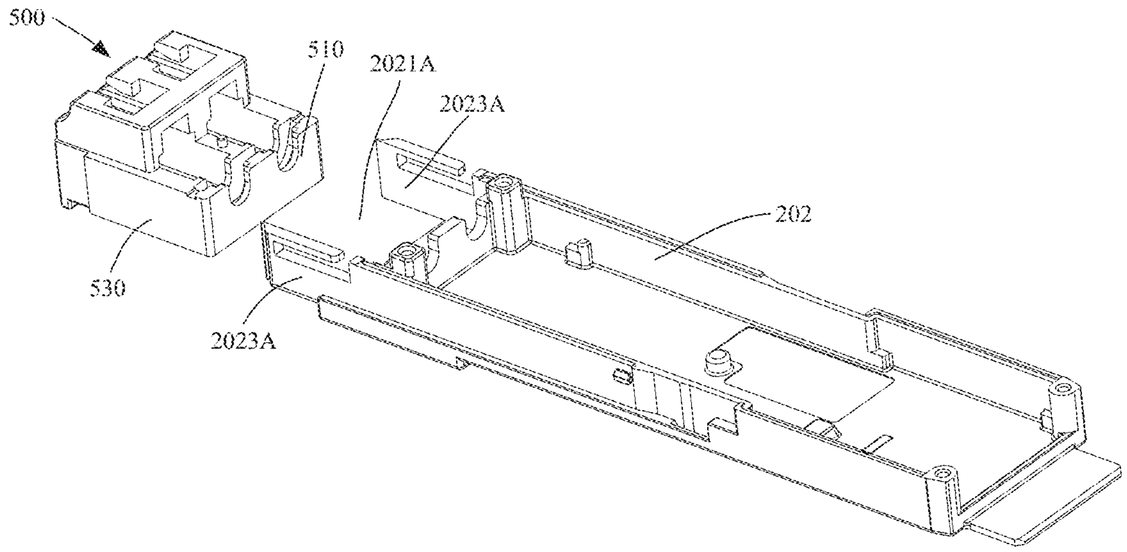
FIG. 17 is an exploded view of a lower shell and an optical port bracket in yet another optical module from another perspective, in accordance with some embodiments.

FIG. 16 is an exploded view of the optical port bracket in yet another optical module, in accordance with some embodiments. FIG. 17 is an exploded view of the optical port bracket in yet another optical module from another perspective, in accordance with some embodiments. As shown in FIGS. 15 to 17, the lower shell 202 is separated from the optical port bracket 500. After the light-emitting component 400A and the light-receiving component 500A are installed on the circuit board 300, then the optical port bracket 500 is installed on an end of the lower shell 202. In this way, the installation error of the optical engine may be reduced when the optical port bracket 500 is installed, the process is simplified, the material cost does not need to be increased, and the reliability is good.

In some embodiments, a mounting groove 2021A is provided at an end of the lower shell 202 proximate to the optical fiber adapter, and the two opposite side walls 2023A of the mounting groove 2021A are two opposite lower side plates of the lower shell 202. An end of the mounting groove 2021A proximate to the optical port bracket 500 is provided with a first opening 2021, and the width of the first opening 2021' along a width direction of the lower shell 202 is equal to the distance between the two opposite side walls 2023A of the mounting groove 2021A. In this way, the optical port bracket 500 may be connected to the lower shell 202 through the first opening 2021' of the mounting groove 2021A.

In some embodiments, a limiting plate 2022A is provided at the end of the lower shell 202 proximate to the mounting groove 2021A, and the limiting plate 2022A is connected to two opposite lower side plates of the lower shell 202. For example, one end of the limiting plate 2022A is connected to one lower side plate of the lower shell 202, and the other end of the limiting plate 2022A is connected to the other lower side plate of the lower shell 202, so that the limiting plate 2022A is fixed in the lower shell 202 along the front-rear direction. When the optical port bracket 500 is inserted into the mounting groove 2021A, the side surface (e.g., the right side surface) of the optical port bracket 500 proximate to the limiting plate 2022A is in contact with the limiting plate 2022A, so as to limit the rightward movement of the optical port bracket 500.

In some embodiments, after installing the light-emitting component 400A and the light-receiving component 500A on the circuit board 300, when the optical port bracket 500 and the lower shell 202 are assembled, the optical port bracket 500 is inserted into the mounting groove 2021A from left to right, so that the two opposite side walls of the optical port bracket 500 are in contact with the two opposite side walls of the mounting groove 2021A until the first side wall 510 of the optical port bracket 500 abuts against the limiting plate 2022A. Then, the side walls of the optical port bracket 500 and the mounting groove 2021A in contact with each other are fixed through the adhesive, thereby realizing the fixation of the optical port bracket 500 with the lower shell 202.

In some embodiments, as shown in FIGS. 15 and 16, the optical module further includes a second optical fiber adapter 800, and the limiting plate 2022A includes a plurality of assembly grooves 2026. The assembly groove 2026 penetrates the limiting plate 2022A along the thickness direction, the assembly groove 2026 includes a second opening 2026, the second opening 2026' faces the upper shell 201, and a corresponding optical fiber adapter may be disposed in the assembly groove 2026 through the second opening 2026, so that the corresponding optical fiber adapter is fixedly connected to the lower shell 202.

For example, the limiting plate 2022A includes two assembly grooves 2026, and the two assembly grooves 2026 include a first assembly groove 2026A and a second assembly groove 2026B. The first assembly groove 2026A and the second assembly groove 2026B are disposed and spaced apart along the front-rear direction. The first assembly groove 2026A is proximate to the lower side plate of the lower shell 202 at the front side, and the second assembly groove 20268 is proximate to the lower side plate of the lower shell 202 at the rear side. The first optical fiber adapter 700 is disposed in the first assembly groove 2026A, and the second optical fiber adapter 800 is disposed in the second assembly groove 2026B.

Figure 18:
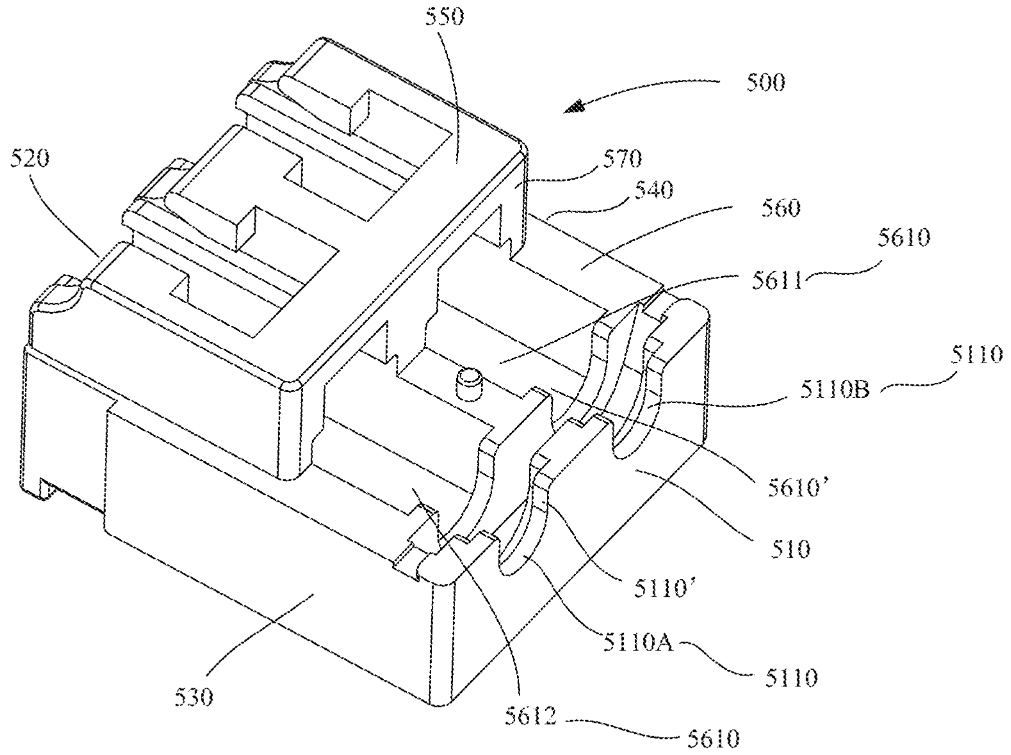
FIG. 18 is a structural diagram of an optical port bracket in yet another optical module, in accordance with some embodiments.
Figure 19:
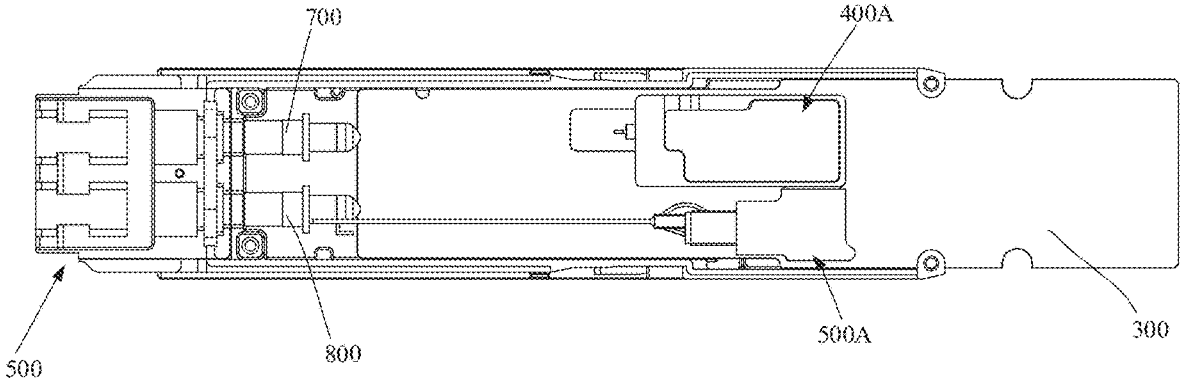
FIG. 19 is a top view of yet another optical module without an upper shell, in accordance with some embodiments.

FIG. 18 is a structural diagram of an optical port bracket in yet another optical module, in accordance with some embodiments. FIG. 19 is a top view of yet another optical module without an upper shell, in accordance with some embodiments. As shown in FIGS. 18 and 19, the optical port bracket 500 includes a first side wall 510 proximate to the optical engine 400, a second side wall 520 opposite to the first side wall 510 in the left-right direction, a third side wall 530 and a fourth side wall 540 disposed opposite in the front-rear direction, and a first surface and a second surface opposite in the up-down direction. The third side wall 530 is connected to the first side wall 510 and the second side wall 520, and the fourth side wall 540 is connected to the first side wall 510 and the second side wall 520.

The optical port bracket 500 includes a plurality of assembly holes 5610, and the assembly hole 5610 penetrates the first side wall 510 and the second side wall 520 of the optical port bracket 500. The assembly hole 5610 includes a fifth opening 5610' and the fifth opening 5610' faces the second sub-surface 560. For example, the optical port bracket 500 includes two assembly holes 5610, and the two assembly holes 5610 include a first assembly hole 5611 and a second assembly hole 5612. The first assembly hole 5611 and the second assembly hole 5612 are sequentially disposed side by side along the front-rear direction of the optical port bracket 500. That is, the first assembly hole 5611 and the second assembly hole 5612 are sequentially disposed along the direction of one side wall of the optical port bracket 500 toward the opposite side wall of the optical port bracket 500.

For example, the first assembly hole 5611 corresponds to the first optical fiber adapter 700, the external optical fiber passes through the first assembly hole 5611 of the optical port bracket 500 and connects to one end of the first optical fiber adapter 700, and the other end of the first optical fiber adapter 700 is connected to the light-emitting component 400A through an internal optical fiber. In this way, the optical signal emitted by the light-emitting component 400A is transmitted to the external optical fiber through the first fiber adapter 700, so as to achieve the transmission of the optical signal.

Similarly, the second assembly hole 5612 corresponds to the second optical fiber adapter 800, the external optical fiber passes through the second assembly hole 5612 of the optical port bracket 500 and connects to one end of the second optical fiber adapter 800, and the other end of the second optical fiber adapter 800 is connected to the light-receiving component 500A through the internal optical fiber. In this way, the optical signal transmitted by the external optical fiber is transmitted to the light-receiving component 500A through the second optical fiber adapter 800, so as to achieve the reception of the optical signal.

For the convenience of inserting the optical port bracket 500 into the mounting groove 2021A at one end of the lower shell 202, the width of the optical port bracket 500 in the front-rear direction is less than the width of the mounting groove 2021A in the front-rear direction. In this way, the optical port bracket 500 may be inserted into the mounting groove 2021A, and the gaps between the two opposite side walls of the optical port bracket 500 and the two opposite side walls of the mounting groove 2021A may be reduced, thereby facilitating the fixation of the optical port bracket 500 and the side walls of the mounting slot 2021A through the adhesive.

When installing, after the light-emitting component 400A and the light-receiving component 500A are installed on the circuit board 300, the optical port bracket 500 is inserted into the mounting groove 2021A at one end of the lower shell 202 from left to right until the first side wall 510 abuts against the side surface of the limiting plate 2022A, so that the optical port bracket 500 is installed in the mounting groove 2021A of the lower shell 202, so as to improve the installation accuracy of the optical engine 400 on the circuit board 300, thereby reducing the installation error of the optical engine 400 relative to the circuit board 300.

In some embodiments, as shown in FIG. 18, the optical port bracket 500 includes a plurality of mounting holes 5110. The plurality of mounting holes 5110 are disposed on the first side wall 510 of the optical port bracket 500. A side (e.g., the upper side) proximate to the upper shell 201 of each mounting hole 5110 has a sixth opening 5110', and the mounting hole 5110 is communicated with the assembly hole 5610 of the optical port bracket 500.

For example, the optical port bracket 500 includes two mounting holes 5110, the two mounting holes 5110 includes a mounting hole 5110A and a mounting hole 5110B, and the mounting hole 5110A and the mounting hole 5110B are spaced apart in the width direction of the optical port bracket 500. In this way, after the optical port bracket 500 is installed in the mounting groove 2021A of the lower shell 202, and the mounting hole 5110 communicates with the mounting groove on the limiting plate 2022A correspondingly. That is, the mounting hole 5110A communicates with the first mounting groove 2026A, and the mounting hole 51108B communicates with the second assembly groove 2026B, so that the first optical fiber adapter 700 and the second optical fiber adapter 800 each are embedded in a groove formed by the corresponding mounting hole 5110 and the assembly groove, so as to support and fix the first optical fiber adapter 700 and the second optical fiber adapter 800 through the groove.

Figure 20:
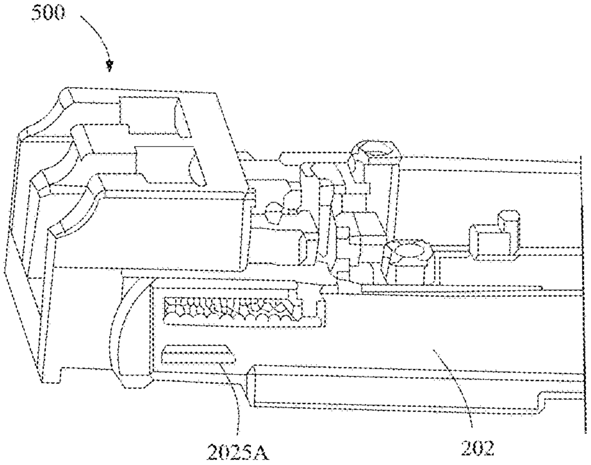
FIG. 20 is a local assembly diagram of a lower shell and an optical port bracket in yet another optical module, in accordance with some embodiments.
Figure 21:
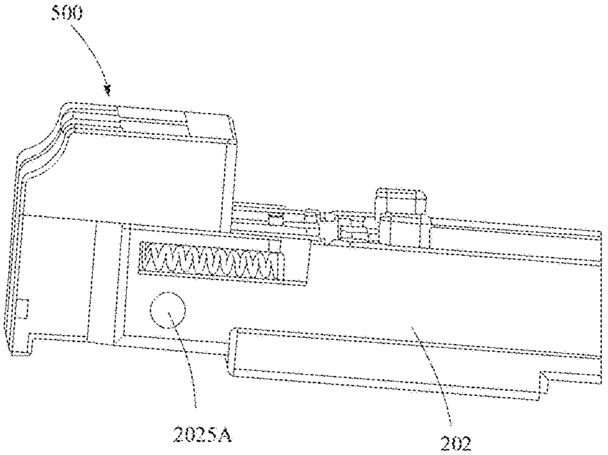
FIG. 21 is another local assembly diagram of a lower shell and an optical port bracket in yet another optical module, in accordance with some embodiments.
Figure 22:
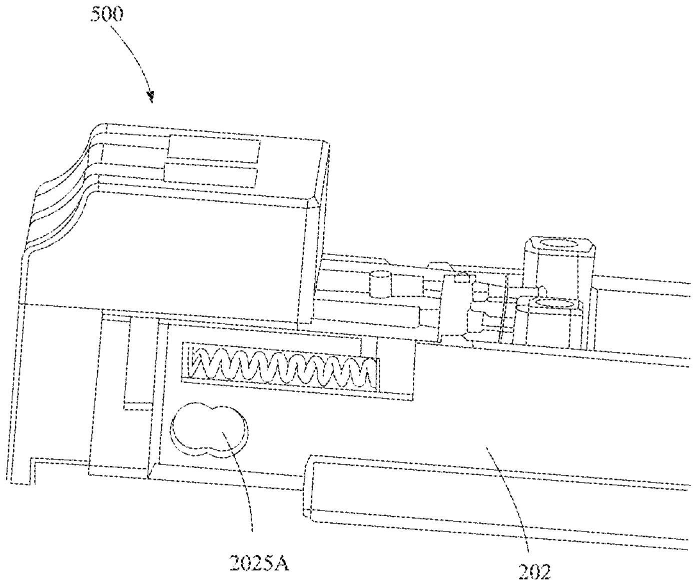
FIG. 22 is yet another local assembly diagram of a lower shell and an optical port bracket in yet another optical module, in accordance with some embodiments.

FIG. 20 is a local assembly diagram of a lower shell and an optical port bracket in yet another optical module, in accordance with some embodiments. FIG. 21 is another local assembly diagram of a lower shell and an optical port bracket in yet another optical module, in accordance with some embodiments. FIG. 22 is yet another local assembly diagram of a lower shell and an optical port bracket in yet another optical module, in accordance with some embodiments.

As shown in FIGS. 20 to 22, the lower shell 202 further includes one or a plurality of dispensing holes 2025A. In a case where the lower shell 202 includes one dispensing hole 2025A, the dispensing hole 2025A is disposed on a side wall of the mounting groove 2021A. In a case where the lower shell 202 includes the plurality of dispensing holes 2025A, the plurality of dispensing holes 2025A are disposed on two opposite side walls of the mounting groove 2021A. For example, the lower shell 202 includes two dispensing holes 2025A, and the two dispensing holes 2025A are disposed on two opposite side walls of the mounting groove 2021A in the front-rear direction, respectively.

After the optical port bracket 500 is installed in the mounting groove 2021A of the lower shell 202, in order to fix the optical port bracket 500, adhesive may be injected between the side surfaces of the optical port bracket 500 and the mounting groove 2021A through the dispensing hole 2025A, so as to realize the fixed connection between the optical port bracket 500 and the lower shell 202 through the adhesive.

For example, when injecting adhesive through the dispensing hole 2025A, firstly, the contact surfaces of the optical port bracket 500 and the lower shell 202 are pre-fixed by means of the ultraviolet ray adhesive (UV adhesive) injected through the dispensing hole 2025A, and then the contact surfaces between the optical port bracket 500 and the lower shell 202 are reinforced by means of a structural adhesive injected through the dispensing hole 2025A, so as to ensure the installation reliability of the optical port bracket 500 and the lower shell 202.

It will be noted that, the structural adhesive has high strength (for example, compressive strength>65 MPa, steel-steel positive tensile bonding strength>30 MPa, shear strength>18 MPa), which can bear large loads and is resistant to aging, fatigue, and corrosion, has stable performance within the expected life, and is suitable for bear the bonding of strong structural members.

When injecting adhesive through the dispensing hole 2025A, the UV adhesive and the structural adhesive are injected into the contact surfaces between the optical port bracket 500 and the lower shell 202 through the dispensing hole 2025A, thereby ensuring the fixed connection of the optical port bracket 500 and the lower shell 202.

For example, the dispensing holes 2025A may have different shapes. As shown in FIGS. 20 to 22, the dispensing hole 2025A may be in a rectangle shape, a circle shape, or an irregular shape.

Figure 23:
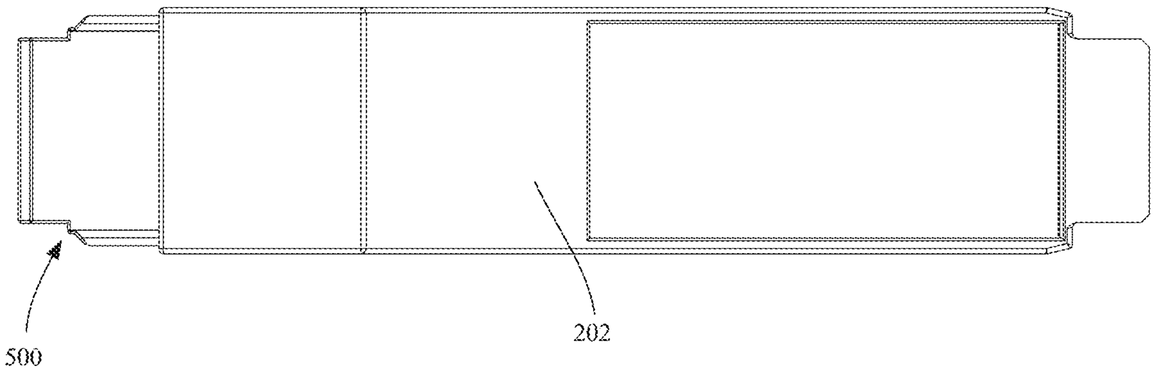
FIG. 23 is a top view of yet another optical module in which a lower shell and an optical port bracket are in an assembled state, in accordance with some embodiments.
Figure 24:
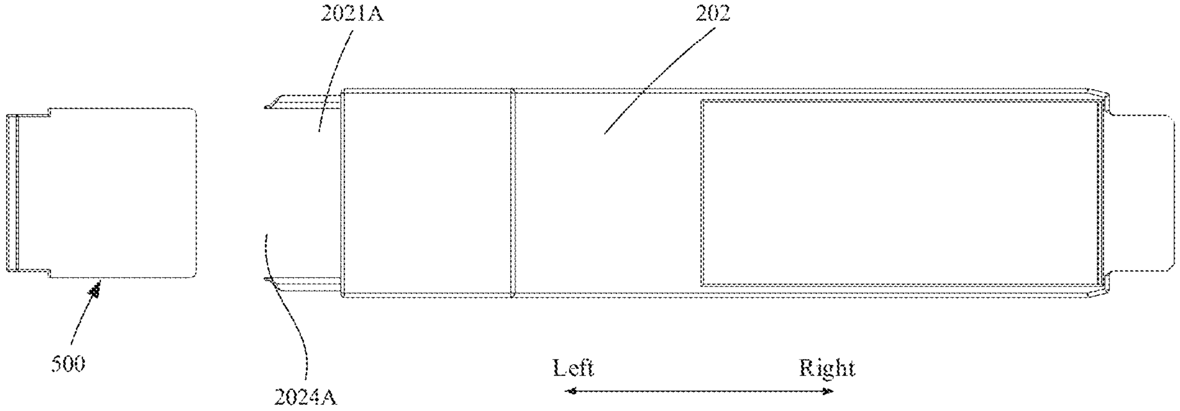
FIG. 24 is a top view of yet another optical module in which a lower shell and an optical port bracket are in a disassembled state, in accordance with some embodiments.

FIG. 23 is a top view of yet another optical module in which a lower shell and an optical port bracket are in an assembled state, in accordance with some embodiments. FIG. 24 is a top view of yet another optical module in which a lower shell and an optical port bracket are in a disassembled state, in accordance with some embodiments. In some embodiments, as shown in FIG. 23, the bottom surface of the mounting groove 2021A may extend from the left end opening of the lower shell 202 to the limiting plate 2022A, so that the bottom surface of the optical port bracket 500 may be bonded to the entire bottom surface of the mounting groove 2021A.

Of course, the present disclosure is not limited thereto. As shown in FIG. 24, the difference between the lower shell in FIG. 24 and the lower shell in FIG. 23 is that the bottom surface of the mounting groove 2021A of the lower shell 202 in FIG. 24 is at least partially open, so as to form a third notch 2024A. For example, the third notch 2024A extends from one side wall (e.g., the front side wall) of the lower shell 202 to the other side wall (e.g., the rear side wall) of the lower shell 202, and the left side of the third notch 2024A is flush with the left end opening (i.e., the first opening 2021') of the lower shell 202 is flush. That is, there is a certain distance between the left end surface of the mounting groove 2021A and the left end opening of the lower shell 202. In this way, the bottom surface of the right side of the optical port bracket 500 is bonded to the bottom surface of the mounting groove 2021A.

For example, the adhesive is coated on the bottom surface of the optical port bracket 500, and then the optical port bracket 500 is moved from left to right into the mounting groove 2021A. The adhesive on the bottom surface of the optical port bracket 500 bonds the bottom surface of the optical port bracket 500 to the inner bottom surface of the mounting groove 2021A. In a case where the mounting groove 2021A is provided with a third notch 2024A, the bonding area between the bottom surface of the optical port bracket 500 and the inner bottom surface of the mounting groove 2021A may be reduced, thereby reducing the bonding force between the optical port bracket 500 and the mounting groove 2021A and facilitating the mounting of the optical port bracket 500 into the mounting groove 2021A of the lower shell 202.

In some embodiments, not only the optical port bracket 500 may be installed into the mounting groove 2021A from left to right, but also the optical port bracket 500 may be installed into the mounting groove 2021A from top to bottom. For example, when the optical port bracket 500 is installed to the mounting groove 2021A from top to bottom, the bottom surface of the optical port bracket 500 is in contact with the inner bottom surface of the mounting groove 2021A, and the adhesive on the bottom surface of the optical port bracket 500 bonds the optical port bracket 500 to the lower shell 202.

After bonding the optical port bracket 500 to the bottom surface of the mounting groove 2021A, firstly, the UV adhesive is injected between the third side wall 530 and the side wall 2023A of the mounting slot 2021A, and between the fourth side wall 540 and the side wall 2023A of the mounting slot 2021A, through the dispensing hole 2025A on the side wall of the lower shell 202, so as to pre-fix the connection between the third side wall 530 and side wall 2023A, as well as the connection between the fourth side wall 540 and side wall 2023A. Then, the structural adhesive is injected between the third side wall 530 and the corresponding side wall 2023A of the mounting slot 2021A, and between the fourth side wall 540 and the corresponding side wall 2023A of the mounting slot 2021A, through the dispensing hole 2025A, so as to reinforce the connection between the third side wall 530 and side wall 2023A, as well as the connection between the fourth side wall 540 and side wall 2023A.

As shown in FIG. 18, the upper end of the second sub-surface 560 of the optical port bracket 500 has a fifth opening 5610', so as to facilitate assembly with the upper shell 201.

Figure 25:
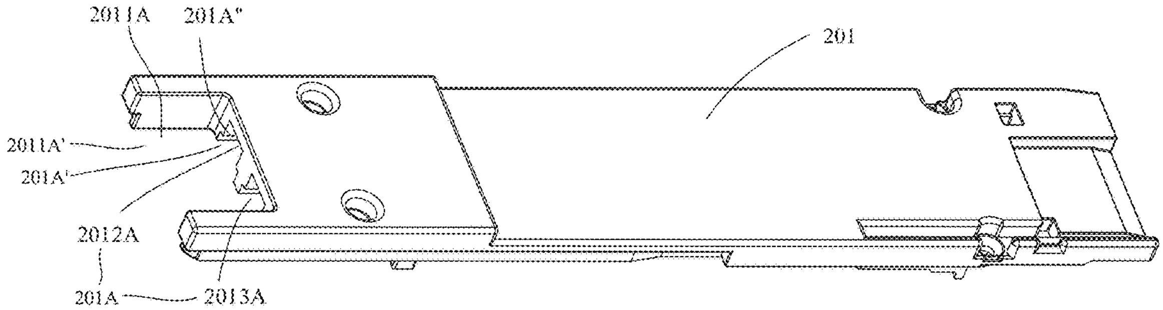
FIG. 25 is a structural diagram of an upper shell in yet another optical module, in accordance with some embodiments.
Figure 26:
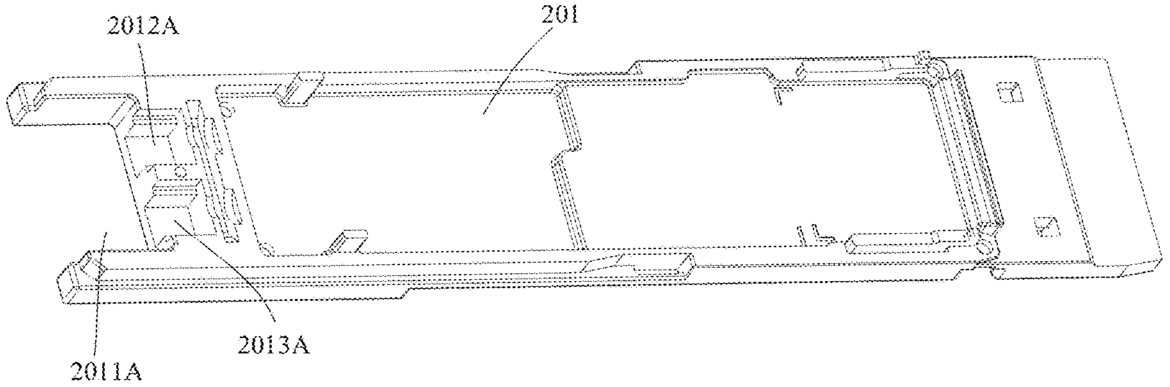
FIG. 26 is a structural diagram of an upper shell in yet another optical module from another perspective, in accordance with some embodiments.

FIG. 25 is a structural diagram of an upper shell in yet another optical module, in accordance with some embodiments. FIG. 26 is a structural diagram of an upper shell in yet another optical module from another perspective, in accordance with some embodiments. As shown in FIGS. 25 and 26, an avoidance hole 2011A is provided on the end of the upper shell 201 proximate to the optical port bracket 500, and the avoidance hole 2011A is opposite to the first sub-surface 550 of the optical port bracket 500. An end surface of the avoidance hole 2011A proximate to the optical port bracket 500 is provided with a third opening 2011A'. For example, the avoidance hole 2011A is located on the left side of the upper shell 201, and an end of the avoidance hole 2011A proximate to the optical port bracket 500 is open, so as to form a third opening 2011A.

In a case where the upper shell 201 is covered on the lower shell 202, the first sub-surface 550 is located in the avoidance hole 2011A, so that the first sub-surface 550 of the optical port bracket 500 and the upper surface of the upper shell 201 (e.g., the surface of the upper shell 201 away from the lower shell 202) are substantially coplanar. In a length direction of the optical module 200, the fifth side wall 570 abuts against a surface of the upper shell 201 provided with the avoidance hole 2011A. The inner bottom surface of the upper shell 201 is connected to the second sub-surface 560 of the optical port bracket 500, so as to limit the optical port bracket 500 in the up-down direction. For example, the upward movement of the optical port bracket 500 may be limited.

In some embodiments, a third groove 201A is provided on the side surface of the upper shell 201 proximate to the lower shell 202, and the lower side surface (e.g., the lower surface) of the third groove 201A proximate to the lower shell 201 is open, so as to form the fourth opening 201A. The third groove 201A is disposed corresponding to the assembly hole 5610 on the right side of the optical port bracket 500, so that the third groove 201A on the lower surface of the upper shell 201 cooperates with the assembly hole 5610 on the right side of the optical port bracket 500. That is, the fourth opening 201A' of the third groove 201A of the upper shell 201 cooperates with the fifth opening 5610' of the optical port bracket 500, so that the assembly hole 5610 of the optical port bracket 500 cooperates with the third groove 201A on the lower side of the upper shell 201, so as to accommodate the corresponding optical fiber adapter.

In some embodiments, the third groove 201A includes a first sub-groove 2012A and a second sub-groove 2013A, the first sub-groove 2012A cooperates with the first assembly hole 5611 of the optical port bracket 500, and the second sub-groove 2013A cooperates with the second assembly hole 5612 of the optical port bracket 500. In this way, it is convenient for the external optical fiber to pass through the first assembly hole 5611 and the second assembly hole 5612 in the optical port bracket 500, so that the external optical fiber may be connected to the light-emitting component 400A and the light-receiving component 500A on the circuit board 300.

In order to cooperate the third groove 201A in the lower side of the upper shell 201 with the assembly hole 5610 on the right side of the optical port bracket 500, the end of the third groove 201A proximate to the optical port bracket 500 is open to form a seventh opening 201A", so as to make the third groove 201A communicate with the avoidance hole 2011A.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. An optical module, comprising:

an upper shell;

a lower shell covered with the upper shell and forming an accommodating cavity with the upper shell;

a light-emitting component or a light-receiving component disposed in the accommodating cavity, the light-emitting component or the light-receiving component being configured to realize emission or reception of light;

an optical port bracket disposed on a bottom surface of the lower shell, and a side surface of the optical port bracket proximate to the lower shell abutting against the bottom surface of the lower shell; and an optical fiber adapter, an end of the optical fiber adapter being connected to the light-emitting component or the light-receiving component, and another end of the optical fiber adapter being connected to the optical port bracket;

wherein the upper shell includes:

a cover plate;

two upper side plates connected to both sides of the cover plate, respectively, and the upper side plates extending toward a direction proximate to the lower shell;

two first limiting members, each first limiting member being disposed on an end of one corresponding upper side plate proximate to the optical port bracket;

the lower shell includes:

a bottom plate;

at least one lower side plate connected to the bottom plate, and the lower side plate extends toward a direction proximate to the upper shell;

at least one first limiting boss disposed on an end of the lower side plate proximate to the optical port bracket;

the optical port bracket includes:

a plurality of side walls having at least two opposite side walls; and at least one second limiting boss disposed on at least one of the two opposite side walls, wherein the optical port bracket is arranged between the two first limiting members of the upper shell, and the two opposite side walls of the optical port bracket are respectively fixedly connected to the two first limiting members of the upper shell; a side surface of the second limiting boss of the optical port bracket proximate to the light-emitting component or the light-receiving component abuts against the first limiting boss of the lower shell, and a surface of the second limiting boss proximate to the lower shell abuts against an inner bottom surface of the lower shell; and a surface of the first limiting boss of the lower shell proximate to the upper shell abuts against a surface of the first limiting member of the upper shell proximate to the lower shell; and wherein the optical module further comprises an unlocking component, the unlocking component including two unlocking handle and two elastic pieces oppositely disposed on the unlocking handles; and a side surface of each first limiting member of the upper shell away from the optical port bracket is provided with a first groove, a side wall of the first groove proximate to the lower shell is at least partially open, so as to provide a first notch, and the elastic piece is assembled into the first groove through the first notch.

2. The optical module according to claim 1, wherein the plurality of side walls of the optical port bracket include:

a first side wall proximate to the light-emitting component or the light-receiving component;

a second side wall disposed opposite to the first side wall;

a third side wall connected to the first side wall and the second side wall; and a fourth side wall disposed opposite to the third side wall, wherein the at least one second limiting boss includes two second limiting bosses disposed on the third side wall and the fourth side wall, respectively, and the two second limiting bosses respectively extend on the third side wall and the fourth side wall in a direction from the second side wall to the first side wall and are respectively protruded from the third side wall and the fourth side wall; and the lower shell includes two first limiting bosses correspondingly abut against the two second limiting bosses;

a side surface of the optical port bracket proximate to the upper shell is connected to the upper shell, the optical port bracket further includes a first surface, and the first surface includes:

a first sub-surface proximate to the upper shell; and a second sub-surface proximate to the upper shell; wherein the first sub-surface is farther away from the lower shell than the second sub-surface, the second limiting boss extends in a direction from the second side wall to the first side wall.

3. The optical module according to claim 2, wherein the optical port bracket further includes:

a mounting hole disposed on the first side wall; and a slot penetrating the second side wall and communicating with the mounting hole, the optical fiber adapter being inserted into the slot through the mounting hole.

4. The optical module according to claim 2, wherein a side surface of the first limiting boss away from the light-emitting component or the light-receiving component abuts against a corresponding second limiting boss of the optical port bracket; and opposite side walls of the two first limiting bosses abut against the third side wall and the fourth side wall of the optical port bracket, respectively; or gaps exist between the opposite side walls of the two first limiting bosses and the third side wall and the fourth side wall of the optical port bracket, respectively.

5. The optical module according to claim 2, wherein the lower side plate of the lower shell further includes at least one second limiting member protruded inwardly from the lower side plate, and the first side wall of the optical port bracket abuts against the second limiting member.

6. The optical module according to claim 2, wherein the optical port bracket further includes a fifth side wall connected to the first sub-surface and the second sub-surface; and a surface of the upper shell proximate to the optical port bracket abuts against the fifth side wall.

7. The optical module according to claim 1, wherein the upper shell further includes at least one limiting column disposed on the upper side plate; and the lower shell further includes at least one first limiting surface disposed on the lower side plate, and the first limiting surface abuts against the limiting column.

8. The optical module according to claim 7, wherein the lower side plate of the lower shell further includes at least one second limiting surface, and the first limiting surface is correspondingly connected to the second limiting surface; a side surface of the first limiting member proximate to the lower shell and a side surface of the limiting column proximate to the lower shell abut against the second limiting surface.

9. The optical module according to claim 7, wherein the upper shell further includes:

a through groove disposed between the first limiting member and the limiting column and penetrating the upper side plate along a thickness direction of the upper side plate, an end of the groove facing the lower shell is at least partially open, so as to provide a second notch.

10. The optical module according to claim 1, wherein an end of the first limiting member away from the lower shell is provided with a first protrusion and a second groove; and in a direction of the first limiting member away from the lower shell, the first protrusion protrudes from the second groove.

* * * * *